United States Patent
Badgwell et al.

(10) Patent No.: US 10,589,221 B2
(45) Date of Patent: Mar. 17, 2020

(54) LOW-EMISSION FIRED HEATER

(71) Applicant: ExxonMobil Research and Engineering Company, Annandale, NJ (US)

(72) Inventors: Thomas A. Badgwell, Clinton, NJ (US); Frank Hershkowitz, Basking Ridge, NJ (US); Timothy A. Barckholtz, Whitehouse Station, NJ (US); Paul J. Berlowitz, Glen Gardner, NJ (US)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 252 days.

(21) Appl. No.: 15/091,856

(22) Filed: Apr. 6, 2016

(65) Prior Publication Data
US 2016/0310892 A1   Oct. 27, 2016

Related U.S. Application Data

(60) Provisional application No. 62/150,462, filed on Apr. 21, 2015.

(51) Int. Cl.
*H01M 8/04*    (2016.01)
*B01D 53/32*    (2006.01)
(Continued)

(52) U.S. Cl.
CPC ....... *B01D 53/326* (2013.01); *B01D 53/8671* (2013.01); *B01D 53/965* (2013.01); *C10G 9/20* (2013.01); *H01M 8/04022* (2013.01); *H01M 8/04097* (2013.01); *H01M 8/145* (2013.01); *B01D 2255/806* (2013.01);
(Continued)

(58) Field of Classification Search
None
See application file for complete search history.

(56) References Cited

U.S. PATENT DOCUMENTS

| 2008/0081233 | A1* | 4/2008 | Rechberger | ........... F28D 7/0066 |
| | | | | 429/423 |
| 2008/0141648 | A1 | 6/2008 | Towler et al. | |
| 2015/0093676 | A1 | 4/2015 | Berlowitz et al. | |

FOREIGN PATENT DOCUMENTS

EP          1277697 A2     1/2003

OTHER PUBLICATIONS

Manzolini et al., "CO2 Separation from Combined Cycles Using Molten Carbonate Fuel Cells," Journal of Fuel Cell Science and Technology, Feb. 2012, pp. 011018-1 to 011018-8, vol. 9, iss. 1, American Society of Mechanical Engineers.
(Continued)

*Primary Examiner* — Wyatt P McConnell
(74) *Attorney, Agent, or Firm* — Liza Negron; David M. Weisberg

(57) ABSTRACT

In various aspects, systems and methods are provided for integrating molten carbonate fuel cells with a fired heater for production of electrical power while also reducing or minimizing the amount of $CO_2$ present in the flue gas generated by the fired heater. The molten carbonate fuel cells can be integrated for use with fired heater so that at least a portion of the flue gas from fired heater flows through cathodes of the fuel cells and at least a portion of the cathode exhaust is returned to a convection section of the fired heater.

17 Claims, 11 Drawing Sheets

(51) Int. Cl.
    *C10G 9/20*        (2006.01)
    *B01D 53/86*       (2006.01)
    *B01D 53/96*       (2006.01)
    *H01M 8/04014*     (2016.01)
    *H01M 8/04089*     (2016.01)
    *H01M 8/14*        (2006.01)

(52) U.S. Cl.
    CPC .......... *B01D 2257/504* (2013.01); *B01D 2258/0283* (2013.01); *H01M 2008/147* (2013.01); *H01M 2300/0051* (2013.01); *Y02E 60/526* (2013.01)

(56) References Cited

OTHER PUBLICATIONS

Desideri et al., "MCFC-based CO2 capture system for small scale CHP plants," International Journal of Hydrogen Energy, Dec. 2012, pp. 19295-19303, vol. 37, iss. 24, SciVerse Science Direct, Elsevier.
Dijkema et al., "Design of a MCFC-upgrade kit for a steam-reforming methanol plant", 1994 International Fuel Cell Seminar, pp. 299-302, Courtesy Associates, Inc., San Diego.
PCT/US2016/026136 International Search Report and Written Opinion dated Apr. 26, 2016.

* cited by examiner

| Configuration Examples | 1 | 2 | 3 |
|---|---|---|---|
| | TU | PS10 | APS 8 |
| | 1 | 10F-2 | F-801 |
| Fired Heater Data | | | |
| Furnace scale | large | large | very large |
| Process Fluid | OIL | OIL | OIL |
| Fired Duty (LHV), MBtu/hr | 105.7 | 129.1 | 289 |
| Fired Duty (LHV), MW | 31.0 | 37.8 | 84.7 |
| Fuel factor (1 = natural gas) | 1 | 1 | 1 |
| Furnace Efficiency (LHV), % | 76.1 | 80 | 83.8 |
| Process Duty, MW | 23.6 | 30.3 | 71.0 |
| Firebox length, m | 20.0 | 15.2 | 27.6 |
| Firebox width, m | 4.80 | 4.54 | 9.22 |
| | | | |
| MCFC Data | | | |
| Total MCFC Power Required, MW | 4.44 | 5.42 | 12.12 |
| Stack width, m (anode length) | 1.50 | 1.50 | 1.50 |
| Stack depth, m (cathode length) | 0.50 | 0.50 | 0.50 |
| Stack height, m | 4.80 | 4.50 | 9.22 |
| Stack Power, kW | 430 | 394 | 807 |
| Cathode flow cross-sectional area, m2 | 2.40 | 2.25 | 4.61 |
| Number of stacks | 11 | 14 | 16 |
| Fuel cell horiz. cross-sec. area, m2 | 79.2 | 94.5 | 221.3 |
| Fuel cell vert. cross-sec. area, m2 | 8.3 | 10.5 | 12.0 |
| radiant section cross-sec. area, m2 | 96.0 | 69.0 | 254.5 |
| MCFCR configuration | HBRC | VAC | HBRC |
| Number of MCFCRs | 1.0 | 2.0 | 1.0 |
| Firebox length residual, m | 3.5 | 1.7 | 3.6 |
| Firebox width residual, m | 0.0 | 0.0 | 0.0 |
| Flue gas volumetric flow, m3/s | 37.6 | 45.9 | 102.8 |
| Cathode superficial velocity, m/s | 1.42 | 1.46 | 1.39 |

FIG. 9.

LOW-EMISSION FIRED HEATER

CROSS-REFERENCE TO RELATED APPLICATIONS

This application claims the benefit of provisional U.S. Ser. No. 62/150,462, filed Apr. 21, 2015, the entire contents of which are expressly incorporated by reference herein.

FIELD OF THE INVENTION

In various aspects, the invention is related to generating electricity and removing $CO_2$ from a fired heater flue gas using molten carbonate fuel cells.

BACKGROUND OF THE INVENTION

Molten carbonate fuel cells utilize hydrogen and/or other fuels to generate electricity. The hydrogen may be provided by reforming methane or other reformable fuels in a steam reformer that is upstream of the fuel cell or within the fuel cell. Reformable fuels can encompass hydrocarbonaceous materials that can be reacted with steam and/or oxygen at elevated temperature and/or pressure to produce a gaseous product that comprises hydrogen. Alternatively or additionally, fuel can be reformed in the anode cell in a molten carbonate fuel cell, which can be operated to create conditions that are suitable for reforming fuels in the anode. Alternately or additionally, the reforming can occur both externally and internally to the fuel cell.

An article in the Journal of Fuel Cell Science and Technology (G. Manzolini et. al., *J. Fuel Cell Sci. and Tech.*, Vol. 9, February 2012) describes a power generation system that combines a combustion power generator with molten carbonate fuel cells. Various arrangements of fuel cells and operating parameters are described. The combustion output from the combustion generator is used in part as the input for the cathode of the fuel cell. One goal of the simulations in the Manzolini article is to use the MCFC to separate $CO_2$ from the power generator's exhaust. The simulation described in the Manzolini article establishes a maximum outlet temperature of 660° C. and notes that the inlet temperature must be sufficiently cooler to account for the temperature increase across the fuel cell. The electrical efficiency (i.e. electricity generated/fuel input) for the MCFC fuel cell in a base model case is 50%. The electrical efficiency in a test model case, which is optimized for $CO_2$ sequestration, is also 50%.

An article by Desideri et al. (*Intl. J. of Hydrogen Energy*, Vol. 37, 2012) describes a method for modeling the performance of a power generation system using a fuel cell for $CO_2$ separation. Recirculation of anode exhaust to the anode inlet and the cathode exhaust to the cathode inlet are used to improve the performance of the fuel cell. The model parameters describe an MCFC electrical efficiency of 50.3%.

Fired heaters are used to heat process streams (gas and/or liquid) by combustion of hydrocarbons in air. Carbon dioxide ($CO_2$), a greenhouse gas, is produced by the combustion reactions and is routinely vented to the atmosphere in the flue gas. Separating $CO_2$ from the flue gas of a conventional fired heater can be accomplished by routing hot flue gas from one or more heaters to a common $CO_2$ separation unit through large-diameter insulated pipe.

SUMMARY OF THE INVENTION

In an aspect, a method of treating flue gas generated by a fired heater using molten carbonate fuel cells is provided, the method including: introducing a fuel and an oxidant into a fired heater; combusting the fuel in the fired heater to produce a flue gas comprising a first content of $CO_2$; passing at least a portion of the flue gas into cathode inlets of a plurality of molten carbonate fuel cells to generate an anode exhaust and a cathode exhaust having a second content of $CO_2$, a ratio of the second content of $CO_2$ to the first content of $CO_2$ being about 0.5:1 or less; and passing at least a portion of the cathode exhaust, optionally substantially all of the cathode exhaust or all of the cathode exhaust, into a convection heating section of the fired heater In another aspect, a fired heater for producing electricity using integrated molten carbonate fuel cells is provided, the fired heater including an anode and cathode, the fired heater comprising: a radiant heating section; a burner, optionally in fluid communication with the radiant heating section and/or located within the radiant heating section, that generates a flue gas that comprises $CO_2$; a plurality of molten carbonate fuel cells, the molten carbonate fuel cells having cathode inlets in fluid communication with the radiant heating section to receive at least a portion of the flue gas, the plurality of molten carbonate fuel cells further having a plurality of cathode outlets configured to discharge a cathode exhaust and a plurality of anode outlets configured to discharge an anode exhaust; and a convection section in fluid communication with the plurality of cathode outlets to receive at least a portion of the cathode exhaust therefrom, optionally substantially all of the cathode exhaust or all of the cathode exhaust, the convection section comprising a plurality of convection tubes to remove heat energy from the cathode exhaust.

BRIEF DESCRIPTION OF THE DRAWINGS

FIG. 9 shows data from calculations for arranging molten carbonate fuel cell rows in various fired heater configurations.

DETAILED DESCRIPTION OF THE EMBODIMENTS

Overview

Figure 1:
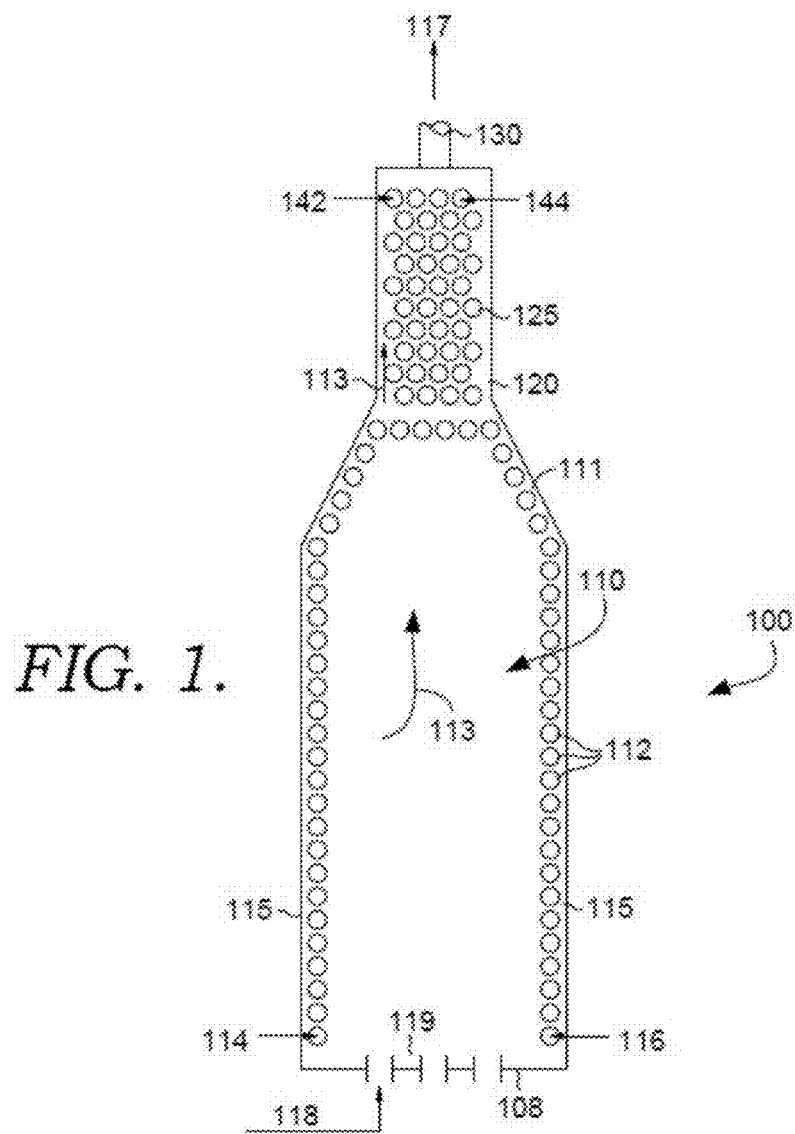
FIG. 1 schematically shows a box-style fired heater.

In various aspects, systems and methods are provided for incorporating molten carbonate fuel cells into a fired heater system for production of electrical power while also reducing or minimizing the amount of $CO_2$ and/or NOx present in the flue gas exiting the fired heater. Integration of molten carbonate fuel cells into a fired heater system can provide various advantages. However, realizing the benefits of integration of molten carbonate fuel cells in a fired heater system can require overcoming several obstacles.

In a conventional fired heater, the typical desired operating conditions can be based on maximizing the heat generated by the heater relative to the amount of fuel delivered to the heater. From a process standpoint, this can partially be achieved by controlling the relative amount of fuel and oxygen delivered to the combustion zone of the fired heater. At a minimum, the amount of oxygen can be sufficient to satisfy the stoichiometric demand for complete combustion of the fuel delivered to the fired heater. From a practical standpoint, however, fired heaters are typically operated with an excess of oxygen. For example, a fired heater using natural gas as a fuel source can be operated with a relative excess total heater oxidant of 0.15 to 0.35. Since air is often used as the source of oxygen, introducing excess oxygen into the combustion reaction can reduce the maximum heat yield that might be achieved. However, the excess air can avoid incomplete combustion that could arise due to variations in the fuel composition and/or due to less than ideal mixing of the fuel and oxygen during combustion of a stoichiometrically ideal ratio of fuel and oxygen.

During conventional operation of a fired heater with a relative excess total heater oxidant (RETHO) of 0.15 to 0.35, complete combustion of a fuel can produce a ratio of $CO_2$ to $O_2$ in the resulting flue gas of at least about 1.5 to 1, or at least about 2 to 1, and often at least about 3 to 1. For example, a typical flue gas from combustion of natural gas and air can have a $CO_2$ content of about 12 mol % and an $O_2$ content of about 4 mol %. This type of ratio can be unsuitable for substantial separation of $CO_2$ from the flue gas by passing the flue gas through a molten carbonate fuel cell cathode. In a molten carbonate fuel cell, one mole of $O_2$ is consumed for each two moles of $CO_2$ that are transported across the molten carbonate electrolyte. Since the effectiveness of a molten carbonate fuel cell can start to drop off as the concentration of $O_2$ falls below about 1.5 mol % or less, or about 1.0 mol % or less, in this example the amount of $O_2$ present in a conventional flue gas may pose challenges if transport of more than about half of the $CO_2$ across the fuel cell membrane is desired.

In order to overcome this obstacle to integration, a fired heater can be operated with an excess of oxygen beyond the amount that is typically desirable for optimized operation of the fired heater. This can be achieved by operating the fired heater with an excess of oxygen, as characterized by a relative excess total heater oxidant (RETHO) value of 0.27 to 0.65. A formal definition for relative excess total heater oxidant is provided below. The goal of providing additional excess oxygen can be to provide sufficient oxygen to allow for a desired level of $CO_2$ transport in the cathode while still maintaining an $O_2$ concentration in the cathode exhaust of at least about 1.0 mol %, or at least about 1.5 mol %, or at least about 2.0 mol %, or at least about 2.5 mol %, or at least about 3.0 mol %. For example, a conventional fired heater powered by a gas phase fuel with 8.2 mol % $CO_2$ in the flue gas can be operated with a relative excess total heater oxidant value of 0.15 to 0.35.

In various aspects, a fired heater that is integrated with molten carbonate fuel cells can instead be operated with a relative excess total heater oxidant (RETHO) value of 0.27 to 0.65. For example, a fired heater that is integrated with molten carbonate fuel cells can be operated with a RETHO value of at least about 0.27, or at least about 0.3, or at least about 0.33, or at least about 0.37, or at least about 0.4, or at least about 0.43, or at least about 0.47, or at least about 0.5 and/or about 0.65 or less, or about 0.60 or less, or about 0.55 or less, or about 0.50 or less, or about 0.47 or less, or about 0.43 or less, or about 0.40 or less, or about 0.37 or less, or about 0.33 or less. It is noted that each of the above lower bounds for the RETHO value is explicitly contemplated in combination with each of the above upper bounds for the RETHO value. To further illustrate the RETHO values, a natural gas fired heater integrated with molten carbonate fuel cells that is configured to transfer about 80% of the $CO_2$ present in the flue gas (prior to entering the cathodes) to the anode exhaust streams of the MCFCs while having about 1 mol % excess $O_2$ in the cathode exhaust can correspond to a RETHO value of about 0.27. As another example, a natural gas fired heater integrated with molten carbonate fuel cells that is configured to transfer about 90% of the $CO_2$ present in the flue gas (prior to entering the cathodes) to the anode exhaust streams of the MCFCs while having about 5 mol % excess $O_2$ in the cathode exhaust can correspond to a RETHO value of about 0.65.

Another series of obstacles to using molten carbonate fuel cells for removing $CO_2$ from a fired heater flue gas can be related to reducing or minimizing the energy losses and/or energy consumption required to integrate the operation of the fired heater and the molten carbonate fuel cells. In a conventional fired heater, the exit temperature of the flue gas from the fired heater can typically be about 130° C. to 450° C. This is less than the typical operating range for a molten carbonate fuel cell, so in such a conventional configuration, additional energy would be needed to heat the flue gas prior to processing in the fuel cell. However, in order to process such flue gas in a molten carbonate fuel cell, the gas in such a conventional configuration would need to be transported to an array of such fuel cells. This represents transport of a large volume of gas that would need transport in an insulated conduit to preserve (as much as possible) the temperature of the flue gas. Any heat lost during transport to a fuel cell array for processing can represent additional energy that would need to be expended prior to introduction into the fuel cell. Such heat loss can be further exacerbated by the fact that the flow rate of flue gas and/or $CO_2$ exiting a typical industrial scale fired heater can be substantially larger than the flow rate that can be handled by a conventional fuel cell stack. As a result, some type of manifold can be required to distribute the flue gas to the fuel cells, creating additional piping surface area for heat loss.

In various aspects, the above difficulties can be addressed by integrating the operation of molten carbonate fuel cells within a fired heater. In some aspects, the integration can correspond to physical integration of molten carbonate fuel cells within the convection zone of a fired heater and/or in a transition region between the radiant heating zone and convection zone of a heater. Additionally or alternately, the integration can correspond to having the molten carbonate fuel cells and the fired heater located in a common thermally insulated volume.

Still further additionally or alternately, the integration can include modifying the operation of the fired heater to improve the operation of the combined integration of fired heater and fuel cells. The typical flue gas from a fired heater can have an insufficient content of $O_2$ to allow for a desired amount of removal of $CO_2$ within a molten carbonate fuel cell. When fuel cells are integrated with a fired heater, attempting to introduce additional oxygen into the fired heater after combustion can pose difficulties. Instead of introducing additional gas into the fired heater flow after combustion, the operation of the fired heater can be modified to include additional oxygen during the combustion reaction. This can lower the flame temperature provided by the fired heater, but can lead to an improved combined operation of the fired heater and fuel cells.

One potential advantage of integrating molten carbonate fuel cells with a fired heater can be related to the volume of the enclosure that can typically be used for a fired heater. Because the fired heater has a limited cross-sectional area, a plurality of molten carbonate fuel cells can be inserted inside the fired heater so that the plurality of molten carbonate fuel cells substantially fills the cross-sectional area of the fired heater. In an aspect, the MCFCs can be installed between the radiant heating section and the convection section of the fired heater. This can allow the combination of the fuel cells and the walls of the fired heater to act as the manifold for the cathode inlets of the fuel cells, as the flue gas passing through the fired heater is forced to pass through one of the fuel cell cathodes in order to continue flowing downstream through the convection heating section. By using the walls of the fired heater to form the cathode input manifold, the overall amount of duct or flow passages associated with the MCFCs can be reduced. In some aspects, the benefits of this type of configuration can include reducing the amount of insulation typically associated with MCFC installations by reducing the need to insulate cathode manifolds. Additionally or alternatively, the benefits of this type of configuration can include other efficiency improvements in comparison to installation of a separate fired heater and MCFC system, such as eliminating heat losses that occurs when transferring flue gas from a fired heater to a separate MCFC system.

In some alternative aspects, at least a portion of the gas flow passing from the radiant section of the fired heater to the convection section can be passed through a plurality of MCFCs that are mounted within a secondary flow path. In such alternative aspects, the portion of the gas flow passing through the secondary flow path can be forced to pass through the MCFC cathodes, such as by having the MCFCs arranged in rows or as an array that fills the cross-sectional area of the secondary flow path. A remaining portion of the gas flow can pass directly from the radiant section to the convection section of the fired heater. Similar benefits can be achieved in such alternative aspects, such as improved efficiency and/or avoiding thermal losses from transfer of hot flue gas to an external MCFC system.

Still another advantage can be that incorporating the molten carbonate fuel cells into the fired heater can allow the flue gas from the burner in the fired heater to be passed into the cathode(s) of the molten carbonate fuel cells at a location in the fired heater where the temperature of the input stream is suitable for use in a fuel cell. Yet another advantage is that the heat produced or consumed by the MCFC is integrated into the fired heater without requiring additional or external heat exchange, as might be required for a standalone system. For example, heat produced by the MCFC can be extracted from the cathode exhaust in a portion of the convection heating section that is downstream of the MCFC. Optionally, the anode exhaust can also be used to provide heat for the convection section of the fired heater.

Still another advantage can be related to separating $CO_2$ at the source of combustion rather than at a remote location. The MCFC removes $CO_2$ from the cathode inlet stream and transfers it to the anode outlet stream, which can have a much smaller flow volume. The smaller anode outlet stream can then be transferred to a $CO_2$ removal system using smaller ducting, saving construction expenses. A centralized $CO_2$ removal system that can process anode outlet streams from MCFCs installed in multiple fired heaters will then need to handle a smaller amount of gas flow compared to treating the combined volume of flue gas from the multiple fired heaters.

Based on one or more of the above advantages, still another advantage of integrating MCFCs within a fired heater system can be an improvement in the overall heat transferred to the process fluid from the fired heater system relative to the amount of fuel consumed in powering the system.

Fired Heater and MCFC Configurations

Because fuel cells can operate effectively in parallel, conventional molten carbonate fuel cell designs can involve incorporating multiple stacks of fuel cells into an enclosure, and then using a manifold to distribute the gas stream for the cathode inlets of the fuel cells to the various enclosures. A parallel flow configuration can have the advantage that the MCFC stacks or modules fed by the manifold can see nominally similar input gas conditions (pressure, temperature, compositions, flow rates), and/or can produce similar outputs and performance parameters. A conventional parallel flow configuration may not impact how the fuel cell electrical output is combined as the cell (or stack or array) electrical outputs can be arranged in a parallel configuration, a series configuration, or a combination of parallel and series configurations.

One of the challenges in using molten carbonate fuel cells (MCFCs) for processing of large scale $CO_2$-containing streams, such as exhaust streams from fired heaters, can be providing a sufficient number of MCFCs to effectively process the volume of the exhaust stream. The pairing of an MCFC system for processing a $CO_2$-containing flue gas could require a very large number of stacks or arrays requiring a large number of valves, interconnects, ducts and manifolds, if installed separately. For example, in order to process a single fired heater's flue gas, a complicated manifold may be needed to distribute the flue gas to one or more fuel cell enclosures. A separate MCFC system would also require an additional footprint within a power production plant. Many chemical processing facilities can have tens or hundreds of fired heaters. Thus, the total footprint used to set a MCFC next to each fired heater could be substantial.

One way of conserving equipment footprint can be to incorporate molten carbonate fuel cells into a fired heater. Incorporating the MCFC's into a fired heater can allow the walls of the fired heater to serve as the manifold for directing the gas flow in fired heater through a plurality of MCFC's. In some aspects, the MCFC's can be inserted between the radiant heating section and the convection section. Generally, the radiant heating section can have a larger cross-sectional area than the convection heating section. In other aspects, the walls of the radiant heating section can be extended to create a volume for the MCFCs before the cross sectional area of the fired heater narrows in the convection section. The temperature of the flue gas once past the last heat transfer element in the radiant heating section can be above a desired operating temperature of the MCFC in some implementations. In this case, a supplemental heat transfer section (alternately referred to as a transition section) may be provided downstream of the last radiant heat transfer tubes and upstream of the cathode inlets in MCFCs. The supplemental heat transfer section can be sized to cool the flue gas to a temperature desired for a cathode feed for the MCFC. The supplemental heat transfer section can serve as a shield section, so that downstream elements in the MCFC and/or fired heater are not exposed to excessive temperatures. In various aspects, the supplemental heat transfer section can reduce the temperature of the flue gas by at least about 25° C., or at least about 50° C., or at least about 100° C., or up to about 250° C. or less. Additionally or alternately, in various aspects, the supplemental heat transfer section can reduce the temperature to about 700° C. or less, or about 650° C. or less.

The supplemental heat transfer section can be installed in a portion of the fired heater having a cross section consistent with the portion where the MCFCs are installed. The MCFC can be installed in the fired heater at a place with the widest available cross-sectional area. In general, the largest cross-sectional area in a fired heater is in the radiant section. Accordingly, the MCFCs can be installed in a section that has a cross-sectional area that is similar to the radiant heating section's cross-sectional area. For example, the body of a fired heater with a cylindrical radiant heating section could be extended upward to provide a volume for the MCFCs. For a box type fired heater, a larger cross-sectional area is generally available. In a box type fired heater, the MCFCs can be located in a position where the MCFCs are above the radiant heating section, so that the temperature is appropriate. The position can also have the cross-sectional area of the radiant heating section, so that a single layer of MCFC rows or arrays can provide a sufficient number of MCFCs for a desired amount of $CO_2$ removal.

Fired heaters can produce heat as a result of the combustion of fuel. Fired heaters are widely used for heating purposes in petroleum refining, petrochemical plants and other chemical process industries. FIG. 1 shows a representative example of a box style fired heater 100.

Fired heaters can generally be built with two distinct heating sections: a radiant section 110, variously called a combustion chamber or firebox, and a convection section 120 followed by the stack 130. The hot flue gases 113 arising in the radiant section 110 from the combustion of fuel flow next into the convection section 120 where the flue gas 113 contacts a tube bundle 125 (that contains a fluid for heating) before leaving the furnace via the stack 130 as a cooled flue gas 117. The radiant section 110 can have a larger cross-sectional area than the convection section 120. A transition section 111 can funnel the flow from the radiant section 110 to the convection section 120. The transition section 111 can be part of the radiant section 111 in an aspect.

In a box style fired heater 100 as shown in FIG. 1, the burners 119 can be located on the floor 108 of the heater. A fuel 118, such as methane can be fed to the burners 119. In the radiant section 110, the tubes 112 may be in any convenient pattern around the walls of the fire box. In the convection section, the tubes may be in any convenient pattern within the convection section and/or around the walls of the convection section. During operation, a fluid that is to be heated by a fired heater can be divided among one or more "passes" of heat transfer tubes, such as a plurality of passes of heat transfer tubes. In the example shown in FIG. 1, two passes of heat transfer tubes are shown. One of the passes can start where fluid enters the tubes 112 at 142. Fluid entering at 142 can travel via the tubes through the convection section and enter the radiant section, where the fluid continues to be heated as it passes through the radiant section. The fluid can finally exit at 114 at the bottom of the radiant section. A second pass can correspond to fluid entering at 144 and exiting at 116. Optionally, radiating cones can be included in the upper part of the radiant section as well as longitudinal fins on the upper parts of tubes. The path the fluid travels through the tubes can allow the fluid to travel from a relatively cool location near the top of the fired heater to a relatively hot location at the bottom of the heater.

Although FIG. 1 shows an example of a box style fired heater, MCFCs can also be incorporated into a vertical-cylindrical fired heater. A vertical-cylindrical fired heater has similar elements to the box style heater of FIG. 1. The primary difference is the elongated shape of the radiant and convection sections in a box style fired heater versus the (approximately round) cylindrical shape of a vertical-cylindrical fired heater.

In an aspect, a conventional fired heater can be modified to include a plurality of molten carbonate fuel cells. This section may be described as a $CO_2$ capture zone. The $CO_2$ capture zone may take a square or rectangular shape, when a cross-section is viewed from the top. The square or rectangular shape can be well adapted to house a plurality of fuel cell stacks, which are traditionally square or rectangular. For example, in a cylindrical heater, the $CO_2$ capture zone could be sized and shaped to house 12 stacks of molten carbonate fuel cells in a 3×4 grid. A transition zone may be provided between a cylindrically shaped radiant heating section and a square or rectangular $CO_2$ capture zone. A second transition zone may also be provided to carry the cathode outlet stream into a cylindrical convection section. For a box style fired heater the box nature of the radiant and convection zones can provide a suitable rectangular cross-sectional area for inclusion of MCFCs.

In an aspect, the $CO_2$ capture zone comprising a plurality of molten carbonate fuel cells can be heat integrated into the fired heater at a point where the flue gas is at a temperature suitable for introduction into the cathodes of the molten carbonate fuel cell. Depending on the desired operational parameters for the fired heater, a supplemental heat transfer section may be provided upstream of the molten carbonate fuel cells to reduce the temperature of the flue gas. The supplemental heat transfer section can be fluidly integrated with tubes in either the radiant heating section or the convection heating section. In an aspect, the supplemental heat transfer section can take the form of a shield comprising convective heating tubes, such as heating tubes that lack fins.

After the $CO_2$ is removed from the flue gas in the $CO_2$ capture zone the $CO_2$ reduced flue gas, also described as the cathode outlet flow, can be introduced into the convection section to further heat a process fluid. The $CO_2$ concentration of the cathode outlet flow can be characterized relative to the $CO_2$ concentration of the flue gas prior to passing through the cathode. In various aspects, the ratio of molar concentration of $CO_2$ in the flue gas exiting the cathodes (cathode outlet exhaust) relative to the molar concentration of $CO_2$ in the in the flue gas entering the cathodes (input gas for cathode inlet) can be about 0.4 or less, or about 0.3 or less, or about 0.2 or less, or about 0.1 or less.

Figure 2:
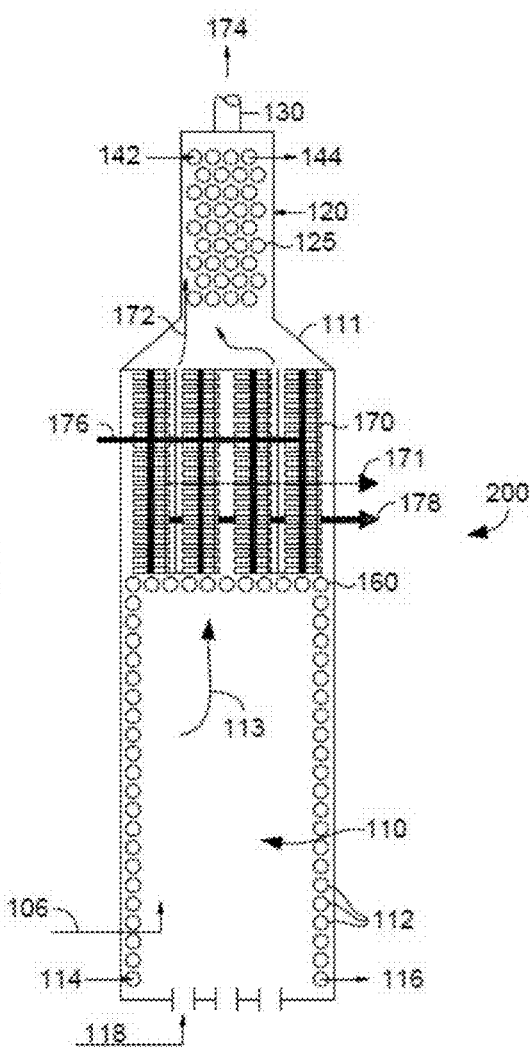
FIG. 2 schematically shows an example of molten carbonate fuel cells integrated within a fired heater.

Turning now to FIG. 2, a diagram of a fired heater 200 with integrated molten carbonate fuel cells 170 is provided. Many of the features of fired heater 200 have been described previously with reference the fired heater 100 of FIG. 1. In contrast to fired heater 100 in FIG. 1, an optional supplemental heat transfer section 160 is provided in addition to the molten carbonate fuel cell section 170. The optional supplemental heat transfer section 160 can comprise, for example, convective heating tubes (optionally without fins). The optional supplemental heat transfer section 160 can reduce the temperature of the flue gas prior to entering the fuel cells for configurations where the temperature of the flue gas at the top of the radiant section is greater than a desired value. The flue gas 113 passes through the supplemental heat transfer section and into the cathode inlets of the fuel cells. The cathode outlet flow 172 flows through the convection heating section 120 and out the stack 130 as a cooled cathode outlet flow 174. An optional inlet 106 for introduction of additional air (or another $O_2$-containing gas) is also shown.

$CO_2$ Content and $O_2$ Content During Fired Heater Operation

In various aspects, additional oxygen can be provided in the flue gas prior to passing the flue gas into the cathodes of the MCFCs. In a typical combustion reaction, substantially complete combustion can usually be achieved with only a modest amount of oxygen remaining after combustion. Because air is a common source of oxygen for combustion, providing an excess of oxygen can also correspond to diluting the overall fuel content of the fuel stream with excess nitrogen. However, when a fired heater is integrated with molten carbonate fuel cells for $CO_2$ removal, additional oxygen can be present in the flue gas to allow for the cathode reaction. For example, based on the stoichiometry of the cathode reaction in the fuel cell, the mol % of $O_2$ in the flue gas can be at least half of the mol % of $CO_2$. In order to allow efficient operation of the fuel cell, in addition to the minimum stoichiometric need, the fired heater can be operated with a relative excess total oxidant of 0.27 to 0.65. The oxygen content of the flue gas after passing through the MCFC cathodes can be at least about 1 mol %, or at least about 1.5 mol %, or at least about 2 mol %, or at least about 3 mol %, or up to about 10 mol %. The additional oxygen in the flue gas can be introduced (such as by adding air) prior to combustion, or the additional oxygen can be introduced after combustion, such as by using an optional supplemental air inlet. One disadvantage of using a supplemental air inlet, however, can be that the supplemental inlet can reduce the efficiency of the fired heater. This can be due in part to requiring an additional opening in the insulation for the fired heater and/or due in part to the fact that the additional air can dilute the heated combustion products in the flue gas. Additionally or alternately, unless such a supplemental air flow is sufficiently heated, the supplemental air flow can cool off the flue gas, thereby reducing the amount of heat transfer in the convection section.

In various aspects, the amount of $CO_2$ in the flue gas prior to entering the MCFC cathodes can be about 6 mol % to about 15 mol %, or about 8 mol % to about 15 mol %. For example, the $CO_2$ content of the flue gas prior to entering the MCFC cathodes can be at least about 6 mol %, or at least about 8 mol %, or at least about 9 mol %, or at least about 10 mol %, and/or about 15 mol % or less, or about 14 mol % or less, or about 13 mol % or less, or about 12 mol % or less, and/or a combination of any of the above identified lower bounds with any of the above identified upper bounds. After removal of $CO_2$, the cathode exhaust from the MCFCs can have a $CO_2$ content of about 6 mol % or less, or about 5 mol % or less, or about 4 mol % or less, or about 3 mol % or less, or about 2 mol % or less, or about 1 mol % or less. The amount of $CO_2$ removed can correspond to a ratio of $CO_2$ in the cathode exhaust to $CO_2$ in the flue gas entering the cathodes of about 0.5 or less, or about 0.4 or less, or about 0.3 or less, or about 0.2 or less, or about 0.1 or less. Depending on the aspect, only a portion of the flue gas may pass through the MCFC cathodes. The portion of the flue gas passing through the cathodes can be at least about 20 vol %, or at least about 30 vol %, or at least about 40 vol %, or at least about 50 vol %, or at least about 60 vol %, or at least about 70 vol %, and/or about 100 vol % or less, or about 99 vol % or less, or about 95 vol % or less, or about 90 vol % or less, or about 80 vol % or less, or about 70 vol % or less, or about 60 vol % or less, or about 50 vol % or less, and/or a combination of any of the above lower bounds and any of the above upper bounds.

In various aspects, the superficial velocity of flue gas moving up through the radiant section to the convection section of a fired heater can be roughly suitable for use as a feed to the MCFC cathodes. Depending on the aspect, the superficial velocity of the gas flow entering the MCFC cathodes can be about 0.5 m/s to about 1.7 m/s. For example, the superficial velocity can be about 1.7 m/s or less, or about 1.5 m/s or less, or about 1.4 m/s or less, or about 1.3 m/s or less.

In some configurations, the available cross-sectional area for the cathodes can be increased by orienting the cathodes of the MCFCs at an angle so that the direction of flow within the cathodes is different from (i.e., not parallel to) the primary direction of flue gas flow in the fired heater. For example, instead of aligning the flow direction of the cathodes with the flow direction in the fired heater, the flow direction of the cathodes can be perpendicular to the flow direction in the fired heater. In this type of configuration, a plurality of rows of MCFCs can be included in the fired heater. This type of configuration can result in some additional pressure drop, as the flue gas can change direction both when entering the cathodes and after exiting the cathodes. However, orienting the MCFCs perpendicular to the flue gas flow (or with another orientation) can allow a row of MCFCs to be comprised of an arbitrary number of stacks, so that a sufficient number of MCFCs can be provided within a fixed cross-sectional area. The flow path can be designed so that all or substantially all of the flue gas passes through the MCFC cathodes, or the flow path can be designed so that only a portion of the flue gas passes through the MCFC cathodes.

Figure 5:
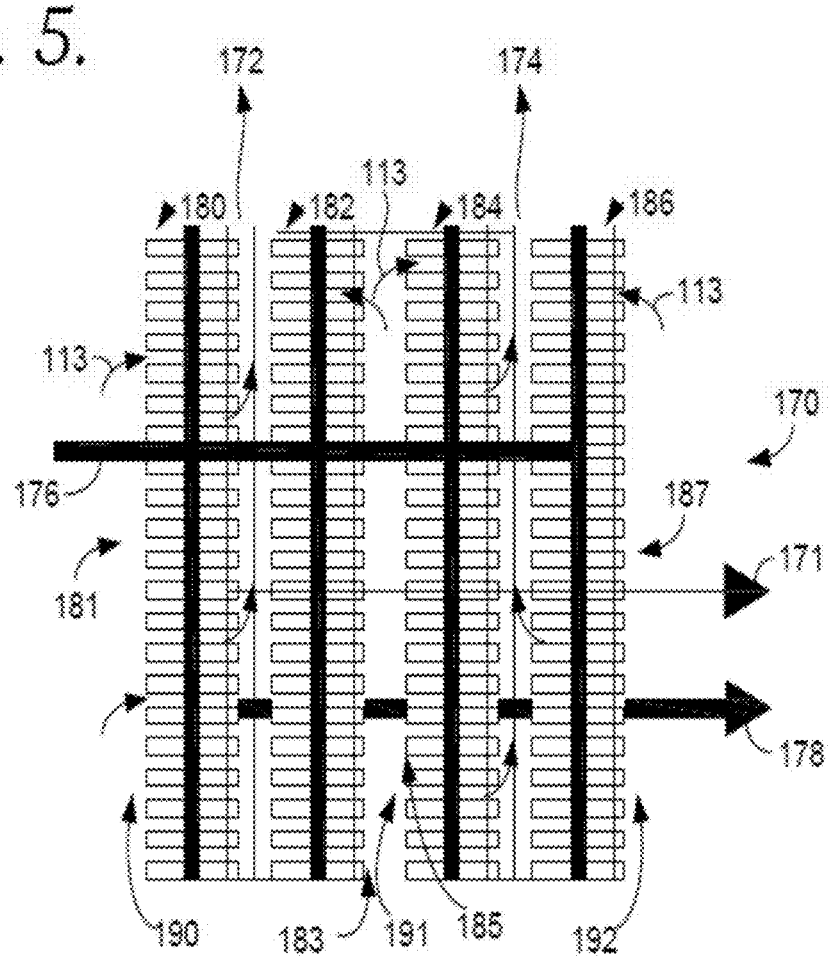
FIG. 5 shows a plurality of molten carbonate fuel cells arranged for placement within a fired heater.

FIG. 5 is a diagram showing an example of a layout that can increase or maximize the available surface area of the fuel cells 170 by orienting the flow direction of the fuel cell cathodes substantially perpendicular to the flow direction of the fired heater. This can be referred to as a vertical orientation for the fuel cells. In FIG. 5, a cross-sectional view of four fuel cell stacks 180, 182, 184, and 186 is shown. FIG. 5 is a cross-section of the fired heater. In one aspect, the plurality of molten carbonate fuels cells comprises 4 rows of fuel cells. More generally, the configuration in FIG. 5 shows having rows of fuel cells where the cathode exhausts from two adjacent rows are combined prior to continuing into the convection section of the fired heater. As a result, the direction of flow through the cathode for fuel cell stacks 180 and 184 is opposite from the direction of flow through fuel cell stacks 182 and 186. In other aspects, the cathode exhaust from each fuel cell row can exit into a separate exit channel. Flue gas 113 can enter the cathode inlet sections 181, 183, 185, and 187 through one of the three channels shown. The left channel 190 is bounded by the face of the left fuel cell stack 180 and the wall of the fired heater (not shown). The center channel 191 is bounded by the left-center fuel cell stack 182 and right-center fuel cell stack 184. The right channel 192 is bounded by the face of the right fuel cell stack 186 and the wall of the fired heater (not shown). The cathode inlets can be the only opening through which flue gas 113 can exit the channels. Cathode exhaust 172 exits the fuel cell stacks and flows through a left exhaust channel formed by the left fuel stack 180 and the left-center fuel cell stack 182. Cathode exhaust 174 exits the fuel cell stacks and flows through a right exhaust channel formed by the right-center fuel cell stack 184 and the right fuel cell stack 186.

In addition to the cathodes, the MCFCs also include anodes. As shown in FIG. 2, but as can be included in any convenient cylindrical, box, or other style fired heater, an anode inlet manifold 176 can distribute an anode inlet flow to the anode inlets of the molten carbonate fuel cells. The anode outlet manifold 178 can receive an anode outlet flow from the anode outlets of the molten carbonate fuel cells. The plurality of fuel cells 170 can also generate electricity that is received by the electrical system 171.

Additional Fired Heater Configurations

Figure 3:
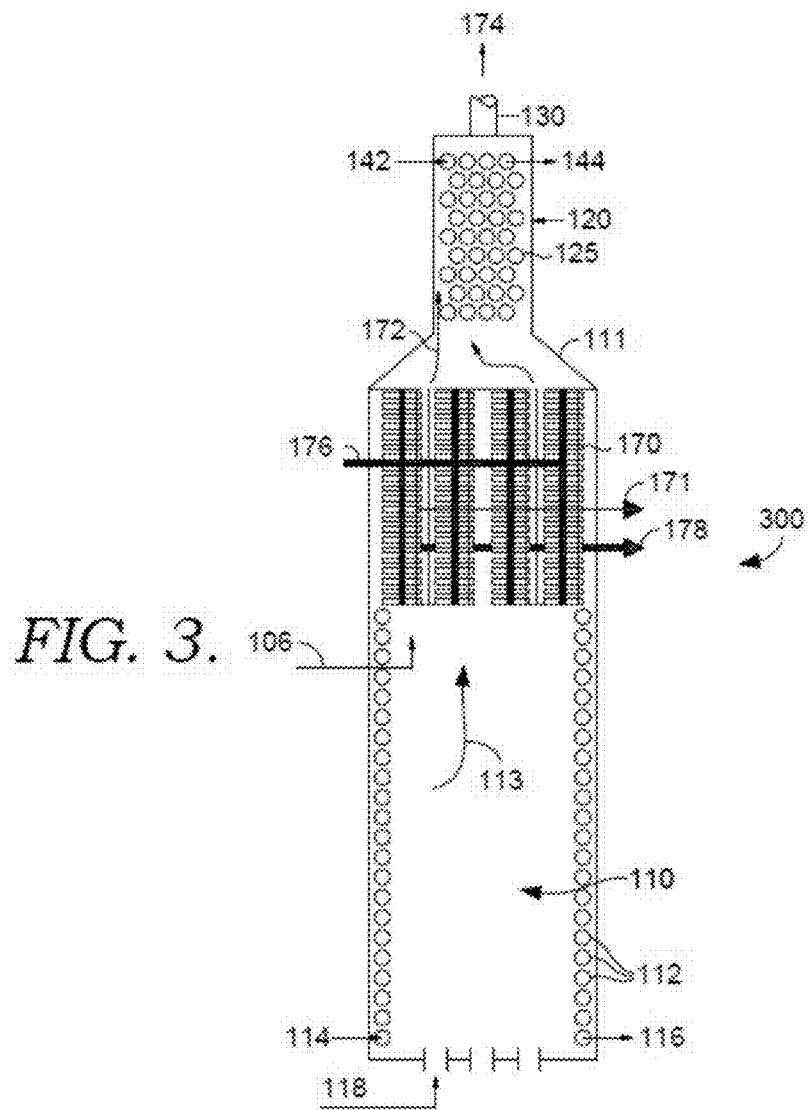
FIG. 3 schematically shows an example of molten carbonate fuel cells integrated within a fired heater.

Turning now to FIG. 3, a diagram of a fired heater 300 with integrated molten carbonate fuel cells 170 is provided. Many of the features of fired heater 300 have been described previously with reference the fired heater 200 of FIG. 2. In contrast to fired heater 200, a supplemental heating section 160 is not provided. A supplemental heating section can be omitted when a temperature of the flue gas 113 is suitable for use as a cathode inlet flow in a MCFC. For example, a flue gas having a temperature of about 700° C. or less, or about 650° C. or less, can be suitable for use in the cathode of an MCFC.

In other aspects, other types of modifications can be provided for the molten carbonate fuel cells and/or the fired heater. This can include modifying the power density of the molten carbonate fuel cell, such as by operating the fuel cell at a voltage lower than the conventional operating voltage of about 0.75 or about 0.80 volts; modifying the shape or geometry of the fuel cell to increase or decrease the cross-sectional area of the faces of the cathodes in the fuel cell stacks relative to the gas flow received and/or to accommodate a higher flow through the cathode; or a combination thereof.

Flue Gas, Cathode Exhaust, and Anode Exhaust

Integrating MCFCs with a fired heater can alter the nature of the exhaust gases generated by the fired heater. In particular, a conventional fired heater can typically generate a single flue gas. By contrast, an integrated fired heater and MCFC system can generate a primary flue gas depleted in $CO_2$ and a secondary "flue gas" in the form of an anode exhaust.

The anode exhaust can correspond to a gas stream enriched in $CO_2$ relative to a conventional flue gas. The amount of the anode exhaust can be characterized in comparison with the main flue gas generated by the fired heater. In various aspects, the volume of the anode exhaust can be about 25% or less of the volume of the $CO_2$-depleted flue gas from the fired heater, or about 20% or less of the volume, or about 15% or less, or about 10% or less. Additionally or alternatively, the concentration of $CO_2$ in the anode exhaust can be at least about 10 vol %, or at least about 20 vol %, or at least about 30 vol %, or at least about 40 vol %, and/or about 60 vol % or less, or about 50 vol % or less. Additionally or alternatively, at least about 50% of the $CO_2$ that enters the cathodes of the MCFCs can exit the MCFCs as part of the anode exhaust, or at least about 60%, or at least about 70%, or at least about 80% or at least about 90%. Still further additionally or alternatively, the total amount of $CO_2$ in the anode exhaust can be characterized relative to the amount of $CO_2$ that enters the cathode exhaust. When a fuel other than $H_2$ is introduced into the molten carbonate fuel cell anode, the reforming of the fuel in the anode can lead to formation of additional $CO_2$ in the anode. In various aspects, the amount of $CO_2$ in the anode exhaust can be at least about 50% of the $CO_2$ that enters the cathodes, or at least about 75%, or at least about 100%, or at least about 110%, or at least about 120%.

In various aspects, providing additional air (or other oxygen) to the burner for the fired heater can also reduce the amount of $NO_X$ produced by a fired heater. $NO_X$ is generally believed to be generated based on the flame temperature of a burner. Adding additional air to the stream delivered to the burner can reduce the flame temperature. The reduction in the flame temperature can lead to reduced production of $NO_X$. Additionally or alternatively, passing the flue gas through the fuel cell cathodes prior to exiting the fired heater can also reduce or minimize the amount of $NO_X$ present in the flue gas. In a fuel cell cathode, $NO_X$ present in the cathode inlet stream can also undergo an electrochemical reaction similar to $CO_2$, with the result that a nitrogen containing ion can be transported across the molten carbonate electrolyte. This can reduce or minimize the $NO_X$ content of the cathode exhaust. Still further additionally or alternately, the fuel cell cathode can also destroy $NO_X$. Based on one or more of the above mechanisms for reducing the amount of $NO_X$ in the flue gas after passing through the cathode exhaust, the need for additional $NO_X$ control on the fired heater can potentially be reduced or possibly even eliminated, thus reducing or minimizing the need for emission control equipment and/or improving efficiency by eliminating the pressure drop (and the powered fans) needed to drive the flue gas through such emission control equipment.

Alternative Configurations

Figure 6:
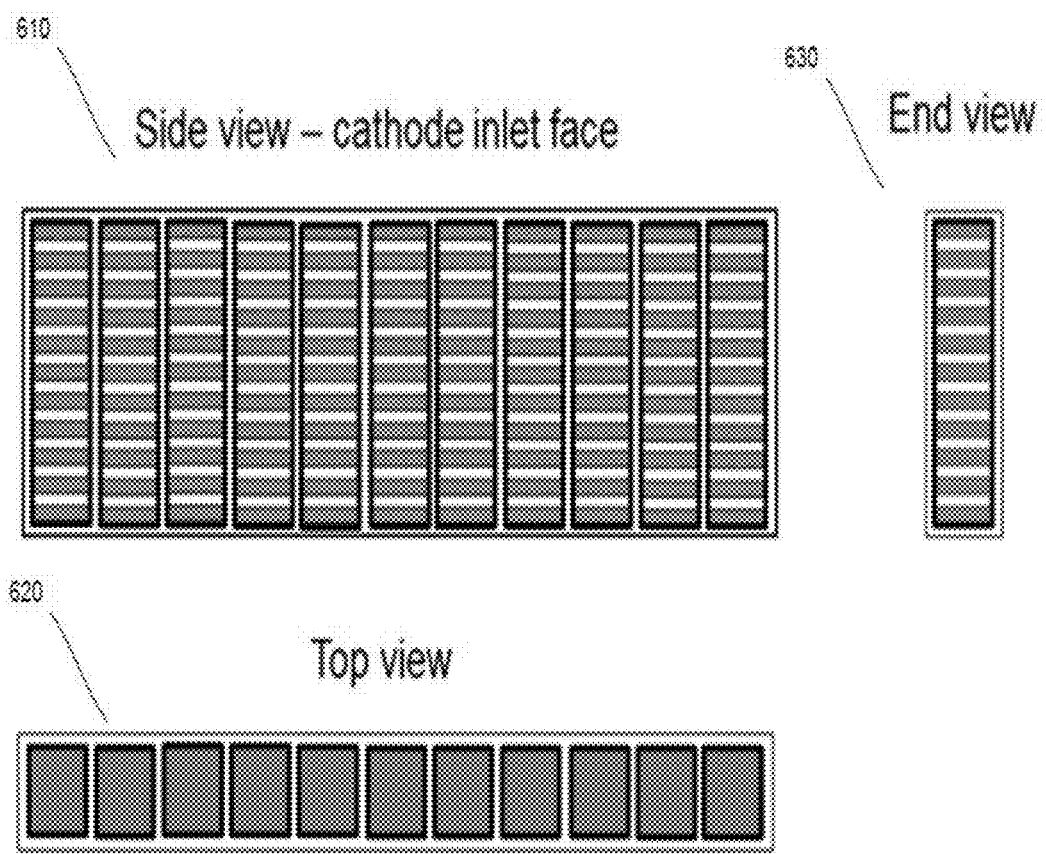
FIG. 6 schematically shows views of an example of a molten carbonate fuel cell row.

As used herein, a Molten-Carbonate Fuel Cell Row (MCFCR) is defined as one or more MCFC stacks standing side by side. The cathode entrances of the stacks face in the same direction, with the cathode exits facing in the opposite direction. The MCFCR has a single anode entrance that is connected to the stack anodes through an anode inlet header, leading through the anodes to an anode outlet header, and ultimately to a single anode exit. FIG. 6 schematically illustrates a MCFCR using a side (front) view 610, a top view 620, and an end view 630.

Figures 7A, 7B:
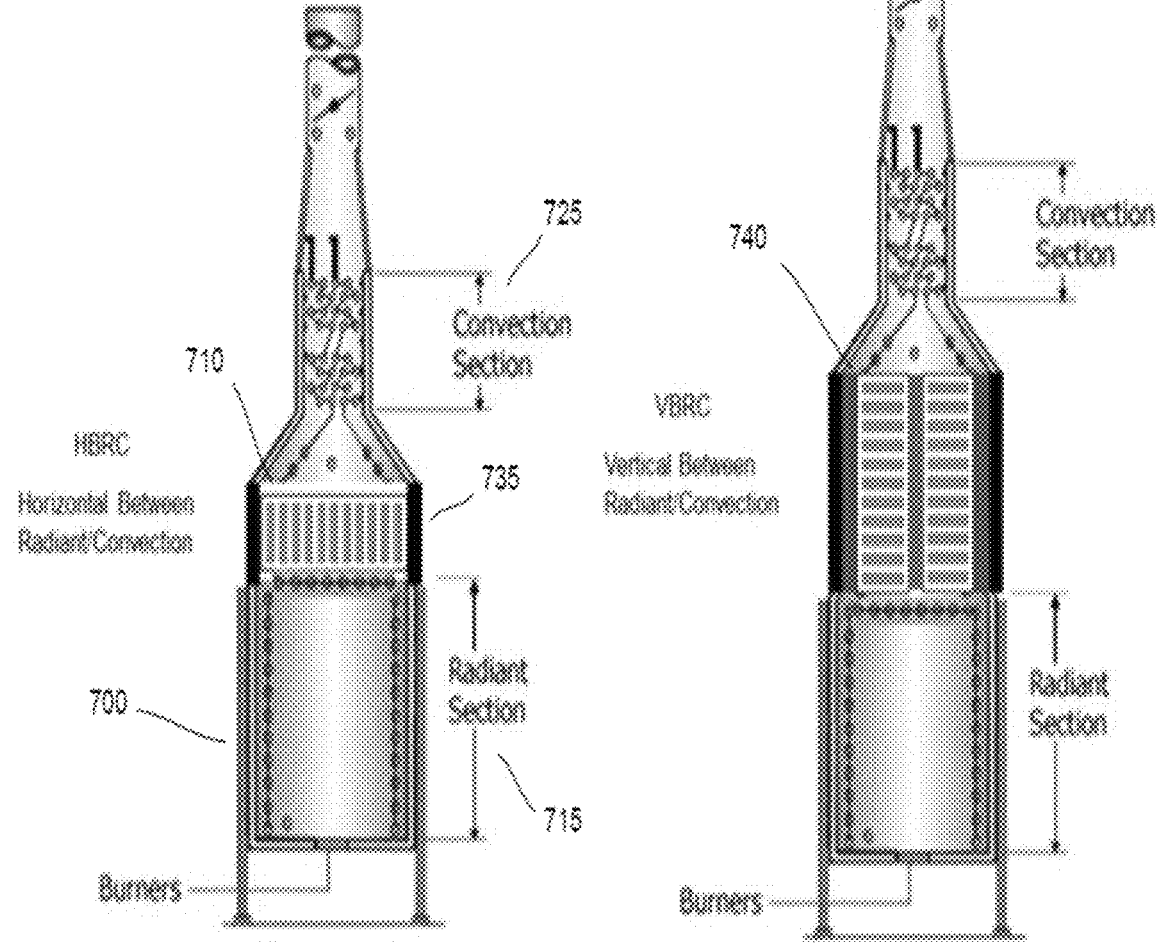
FIGS. 7A and 7B schematically show examples of arrangement of molten carbonate fuel cell rows for integration with a fired heater.

In some aspects, when molten carbonate fuel cells are integrated with a fired heater, the fuel cells can be arranged as one or more MCFCRs. MCFCRs can be arranged in a variety of configurations within a fired heater. For example, MCFCRs can be arranged in a horizontal configuration within a fired heater, as shown in FIG. 7A. In FIG. 7A, MCFCRs 710 are located in a region of fired heater 700 that is above the radiant section 715, and therefore MCFCRs 710 could be considered as being part of the convection section 725. However, the cross-sectional area where the MCFCRs are located is similar to the cross-section of the radiant section 715. This type of larger cross-sectional area portion of a convection section can be referred to as a transition region or a supplemental heat transfer section 735. This type of transition region can conceptually appear to be between the radiant and convection sections and can be a suitable location for MCFCRs, as the temperature of the flue gas is suitable for processing in the molten carbonate fuel cells, while the cross-sectional area is large enough to accommodate a sufficient number of fuel cells in a horizontal orientation to effectively process the flue gas. In FIG. 7A, the MCFCRs are arranged so that the direction of the fuel cell row(s) is roughly perpendicular to the primary direction for the flow of flue gas within the fired heater. The fuel cell row(s) can be oriented so that the direction of flow within the cathodes is roughly parallel to the primary direction of flow within the fired heater. Alternatively, the direction of flow within the cathodes can be offset by any convenient amount relative to the primary direction of flow, such as having a direction of flow within the cathodes that is roughly perpendicular to the primary direction of flow of flue gas within the fired heater. Additionally or alternately, if sufficient fuel cells can be arranged within the narrower cross-sectional area of a later part of the convection region, the horizontally arranged MCFCRs could be located in such a location.

As an alternative to a horizontal orientation, MCFCRs 740 can be arranged in a vertical orientation within a convection section and/or a supplemental heat transfer section. The vertical orientation for MCFCRs 740 is shown in FIG. 7B. In this type of configuration, the number of fuel cells needed for processing the flue gas may be larger than the number of fuel cells that can be accommodated in the cross-sectional area of the fired heater in a horizontal orientation. To provide additional space for the desired amount of fuel cells, the MCFCRs can be oriented so that the direction of the fuel cell row(s) is roughly parallel to the primary direction of flow. In this type of orientation, the direction of flow in the fuel cell cathodes can be roughly perpendicular to the primary direction of flow for the flue gas.

Figure 8A:
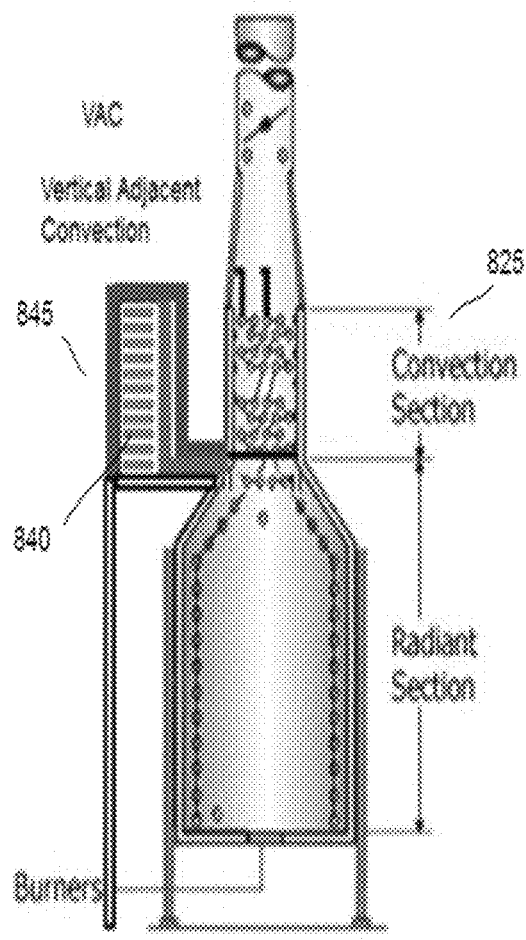
FIGS. 8A and 8B schematically show examples of arrangement of molten carbonate fuel cell rows for integration with a fired heater.
Figure 8B:
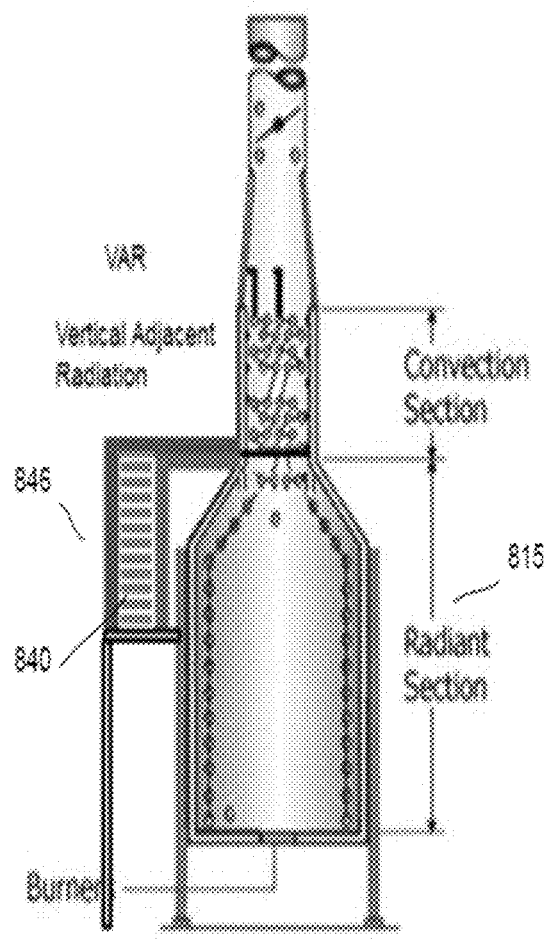

Still other options for arranging MCFCRs for integration with a fired heater can involve placing the MCFCRs in a thermally integrated adjacent enclosure. FIGS. 8A and 8B show examples of arranging MCFCRs in adjacent enclosures. In FIG. 8A, MCFCRs 840 are arranged vertically in an enclosure 845 that is adjacent to the convection section 825. During operation, at least a portion of the flue gas in the fired heater is passed out of the primary flow path and into the adjacent enclosure 845. The diverted portion of the flue gas is then passed through the molten carbonate fuel cells in the adjacent enclosure and returned to the fired heater at a downstream location. It is noted that in some aspects all or substantially all of the flue gas can be diverted into the adjacent enclosure for processing by the molten carbonate fuel cells.

FIG. 8B shows a similar type of adjacent configuration, with the exception that the enclosure 846 is adjacent to the radiant section 815 as opposed to the convection section. Still other options could involve arranging the MCFCRs in a horizontal orientation rather than a vertical orientation.

In some aspects, the fired heater can be a natural draft fired heater. A natural draft fired heater can make use of the buoyancy of warm flue gas to draw air through the furnace and to maintain a slightly negative (i.e. slightly below ambient) pressure in the radiant and convective sections of the furnace. Such designs can provide a high level of inherent safety because heater box leaks result in leaks of air into the furnace as opposed to the leaks of hot flue gas out of the heater that would occur if the heater was operating at slightly positive (i.e. slightly above ambient) pressure. The amount of buoyancy driving force can be set by the density of the flue gas and the height of the exhaust stack. Lower density flue gas and/or higher exhaust stacks can provide greater buoyancy driving forces. Buoyancy can be increased with increased flue gas temperature, but this wastes heat and reduces heater efficiency. An advantage of the present invention is that removal of $CO_2$ (molecular weight 44) and $O_2$ (molecular weight 32) from the flue gas can reduce the density of the flue gas and improve the buoyancy driving force. However, even with this improvement, buoyancy driving forces can often be relatively small. If additional pressure drops of sufficient size are present within the flow path of the fired heater, the additional pressure drops may disrupt the natural-draft flow pattern. In various aspects, integration of fuel cell stacks and a fired heater can provide an advantage by positioning the fuel cell stacks within or immediately adjacent to the heater gas flow path. Such a positioning can reduce or minimize the pressure drop associated with the fuel cell stacks, which can allow the combined heater-fuel cell assembly to operate in natural-draft operation. In this type of natural-draft fired heater/fuel cell aspect, the flue gas buoyancy can be sufficient to draw air into the heater, maintaining a slightly negative pressure, while also providing the pressure driving force to draw the flue gas through the fuel cell cathode.

In other aspects, the fired heater can use air/flue gas heat exchange to improve heater efficiency by transferring heat from the flue gas to the incoming air. Heaters of this sort, known as forced draft fired heaters, can use circulation blowers to remove a fraction of the flue gas, drive it through a heat exchanger (against incoming air) and then return that flue gas to the exhaust stack. In such heaters, the slightly-negative heater-box pressure may still be maintained by buoyancy in the stack. However, the cooler flue gas temperature can result in a challenge to provide adequate buoyancy. In various aspects, integration of fuel cell stacks and a fired heater can provide an advantage by positioning the fuel cell stacks within or immediately adjacent to the heater gas flow path so that the pressure drop in minimized. Additionally or alternately, the removal of $CO_2$ from the flue gas can enhance buoyancy and/or enable use of lower temperature flue gas, which can also improve heater efficiency.

The configurations described herein can be suitable for use in a variety of types and/or configurations of fired heaters, including box or cabin and vertical or cylindrical. Additionally or alternately, the configurations described herein can be suitable for use with fired heaters that are specialized, such as fired heaters that are integrated with other processing equipment for performing chemical reactions. Examples of such specialized fired heaters can include, but are not limited to, Steam-Methane Reformers, Ethylene Furnaces, and Delayed-Coking Furnaces.

Definitions

Fired Heater: As used herein, a fired heater is defined as a type of furnace where fuel is combusted to produce heat for a process fluid. In aspects of the invention, MCFCs can be installed in various types of fired heaters, including both box-type fired heaters and vertical-cylindrical fired heaters. Fired heaters can include a radiant heating section and convection heating section. Fired heaters can be used to heat process fluids in various industrial processes. The process fluids flow through the radiant and convective tubes. Included in this definition are those fired heaters that have chemical reactions in the process tubes, such as steam-methane reformers, ethylene cracking furnaces, and delayed-coking furnaces.

Radiant Heating Section: As used herein the radiant heating section is defined as the section of a fired heater where a majority of the heat is transferred to the process fluid via radiant heating, as opposed to convective heating. The radiant heating section can sometimes be referred to as a radiant section. Radiant heating tubes receive radiation from the combustion of fuel, such as methane. In an aspect, the radiant heating tubes can be located around the exterior of the radiant heating section. The radiant tubes can be oriented vertically, horizontally, or in some other arrangement. The radiant tubes are constructed of a material that can resist the high temperatures of the fire box.

Convective Heating Section: As used herein the convective heating section is defined as the section of a fired heater where a majority of the heat is transferred to the process fluid via convective heating, as opposed to radiant heating. The convective heating section can sometimes be referred to as a convection section or a convective section. The convective heating tubes can include fins and are configured to be heated through convection.

Injected Total Heater Oxidant (ITHO): As used herein, the injected total heater oxidant is defined as the sum of all molar flowrates of free oxygen streams entering the fired heater, from the entrance of the radiant section to the exit of the convection section.

Total Heater Combustion Fuel (THCF): As used herein, the total heater combustion fuel is defined as the sum of all molar flowrates of combustion fuels entering the fired heater, from the entrance of the radiant section to the exit of the convection section. Note that this specifically excludes all fuel streams introduced into the anodes of the MCFC stacks. The fuel streams introduced into the anode flow paths of the MCFC stacks are in a distinct flow path. While limited fluid communication can occur between the cathode flow path and the anode flow path of an MCFC via transport across the electrolyte, such fluid communication does not allow gas entering the anode inlet to be transferred to the flue gas in the fired heater via the cathode flow path. Therefore, combustion fuels introduced into the anode flow path do not become part of the input flow and/or flue gas in the fired heater.

Stoichiometric Total Heater Oxidant (STHO): As used herein, the stoichiometric total heater oxidant is defined as the molar flowrate of free oxygen that would be required to completely combust the total heater combustion fuel, converting all hydrocarbon molecules into carbon dioxide and water.

Excess Total Heater Oxidant (ETHO): As used herein, the excess total heater oxidant is defined as the value found by subtracting the stoichiometric total heater oxidant from the injected total heater oxidant.

Relative Excess Total Heater Oxidant (RETHO): As used herein, the relative excess total heater oxidant is defined as the value found by dividing the excess total heater oxidant by the stoichiometric total heater oxidant. The Relative Excess Total Heater Oxidant (RETHO) can be used to distinguish the operation of a fired heater with integrated fuel cells from that of a conventional fired heater. As an example, the following formula can be used to estimate the REHTO for a fired heater that is fired by natural gas:

$$RETHO = \frac{(5.240x_{O2} + .2682\beta - .8047\beta x_{O2})}{(1 - 4.762x_{O2})}$$

Here $x_{O2}$ is the mole fraction of oxygen at the exit of the convection section, and $\beta$ is the fraction of $CO_2$ removed from the flue gas stream. For a typical value of $x_{O2}$=0.03 the RETHO is 0.1834 for a conventional fired heater ($\beta$=0), and the RETHO is 0.4681 for a fired heater having integrated molten carbonate fuel cells that are operated to achieve 90% recovery of $CO_2$ (($\beta$=0.9). For other values of $x_{O2}$ this relationship can be consistent in that the RETHO for a conventional fired heater can be smaller than the RETHO for a fired heater having integrated fuel cells that is otherwise operated with a similar fired duty, by about a factor of $\beta x_{O2}$.

Fired Heater Path Length: As used herein, the fired heater path length is defined as the linear distance from the burners or fire box in the fired heater to the mid-point of the farthest convective heating tube within the fired heater enclosure. In the event that measurement from different locations would result in different distances, the minimum possible distance is selected. It is noted that the minimum flue gas flow path length may be different from the fired heater path length. In particular, if the MCFCs are located in an adjacent volume and/or if the flue gas flow path through the MCFC cathodes is not aligned with the primary flow direction in the fired heater, the minimum flow path length within the heater will be greater than the linear distance corresponding to the fired heater path length.

Flue Gas Flow Path Length: As used herein, the flue gas flow path length is defined as the average linear distance that flue gas molecules travel on their path from the burners in the radiant section to the last convective heating tube in the convection section. In some aspects, a ratio of the flue gas flow path length to the fired heater path length can be at least about 1.0 to 3.0, or about 1.1 to about 3.0, or about 1.0 to about 2.8, or about 1.1 to about 2.8, or about 1.0 to about 2.5, or about 1.1 to about 2.5, or about 1.0 to about 2.2, or about 1.1 to about 2.2.

Contiguous Insulated Environment: As used herein, a contiguous insulated environment refers to a thermally integrated environment for a fired heater and associated molten carbonate fuel cells. Molten carbonate fuel cells that are within the same insulated environment as the fired heater, and that are less than two times the Fired Heater Path Length away from the interior of the fired heater, are defined as forming a contiguous insulated environment with the fired heater.

Combined Fired Heater and Fuel Cell Energy Thermal Efficiency: As used herein, the combined fired heater and fuel cell energy thermal efficiency is defined as a ratio of specified energy outputs from the combination of the fired heater and molten carbonate fuel cells versus the energy inputs required for operation of the fired heater and molten carbonate fuel cells. As used herein, the specified energy outputs are a) the heat energy transferred to the process fluid of the fired heater, b) the electrical output from the MCFC, and c) the chemical output of the MCFC, and d) heat energy produced by the fuel cell reactions.

Syngas: In this description, syngas is defined as mixture of $H_2$ and CO in any ratio. Optionally, $H_2O$ and/or $CO_2$ may be present in the syngas. Optionally, inert compounds (such as Nitrogen) and residual reformable fuel compounds may be present in the syngas. If components other than $H_2$ and CO are present in the syngas, the combined volume percentage of $H_2$ and CO in the syngas can be at least 25 vol % relative to the total volume of the syngas, such as at least 40 vol %, or at least 50 vol %, or at least 60 vol %. Additionally or alternately, the combined volume percentage of $H_2$ and CO in the syngas can be 100 vol % or less, such as 95 vol % or less or 90 vol % or less.

Reformable fuel: A reformable fuel is defined as a fuel that contains carbon-hydrogen bonds that can be reformed to generate $H_2$. Hydrocarbons are examples of reformable fuels, as are other hydrocarbonaceous compounds such as alcohols. Although CO and $H_2O$ can participate in a water gas shift reaction to form hydrogen, CO is not considered a reformable fuel under this definition.

Reformable hydrogen content: The reformable hydrogen content of a fuel is defined as the number of $H_2$ molecules that can be derived from a fuel by reforming the fuel and then driving the water gas shift reaction to completion to maximize $H_2$ production. It is noted that $H_2$ by definition has a reformable hydrogen content of 1, although $H_2$ itself is not defined as a reformable fuel herein. Similarly, CO has a reformable hydrogen content of 1. Although CO is not strictly reformable, driving the water gas shift reaction to completion will result in exchange of a CO for an $H_2$. As examples of reformable hydrogen content for reformable fuels, the reformable hydrogen content of methane is $4H_2$ molecules while the reformable hydrogen content of ethane is $7H_2$ molecules. More generally, if a fuel has the composition CxHyOz, then the reformable hydrogen content of the fuel at 100% reforming and water-gas shift is $n(H_2$ max reforming)=2x+y/2−z. Based on this definition, fuel utilization within a cell can then be expressed as $n(H_2$ ox)/$n(H_2$ max reforming). Of course, the reformable hydrogen content of a mixture of components can be determined based on the reformable hydrogen content of the individual components. The reformable hydrogen content of compounds that contain other heteroatoms, such as oxygen, sulfur or nitrogen, can also be calculated in a similar manner.

Oxidation Reaction: In this discussion, the oxidation reaction within the anode of a fuel cell is defined as the reaction corresponding to oxidation of $H_2$ by reaction with $CO_3^{2-}$ to form $H_2O$ and $CO_2$. It is noted that the reforming reaction within the anode, where a compound containing a carbon-hydrogen bond is converted into $H_2$ and CO or $CO_2$, is excluded from this definition of the oxidation reaction in the anode. The water-gas shift reaction is similarly outside of this definition of the oxidation reaction. It is further noted that references to a combustion reaction are defined as references to reactions where $H_2$ or a compound containing carbon-hydrogen bond(s) are reacted with $O_2$ to form $H_2O$ and carbon oxides in a non-electrochemical burner, such as the combustion zone of a combustion-powered generator.

Aspects of the invention can adjust anode fuel parameters to achieve a desired operating range for the fuel cell. Anode fuel parameters can be characterized directly, and/or in relation to other fuel cell processes in the form of one or more ratios. For example, the anode fuel parameters can be controlled to achieve one or more ratios including a fuel utilization, a fuel cell heating value utilization, a fuel surplus ratio, a reformable fuel surplus ratio, a reformable hydrogen content fuel ratio, and combinations thereof.

Fuel utilization: Fuel utilization is an option for characterizing operation of the anode based on the amount of oxidized fuel relative to the reformable hydrogen content of an input stream can be used to define a fuel utilization for a fuel cell. In this discussion, "fuel utilization" is defined as the ratio of the amount of hydrogen oxidized in the anode for production of electricity (as described above) versus the reformable hydrogen content of the anode input (including any associated reforming stages). Reformable hydrogen content has been defined above as the number of $H_2$ molecules that can be derived from a fuel by reforming the fuel and then driving the water gas shift reaction to completion to maximize $H_2$ production. For example, each methane introduced into an anode and exposed to steam reforming conditions results in generation of the equivalent of $4H_2$ molecules at max production. (Depending on the reforming and/or anode conditions, the reforming product can correspond to a non-water gas shifted product, where one or more of the $H_2$ molecules is present instead in the form of a CO molecule.) Thus, methane is defined as having a reformable hydrogen content of $4H_2$ molecules. As another example, under this definition ethane has a reformable hydrogen content of $7H_2$ molecules.

The utilization of fuel in the anode can also be characterized by defining a heating value utilization based on a ratio of the Lower Heating Value of hydrogen oxidized in the anode due to the fuel cell anode reaction relative to the Lower Heating Value of all fuel delivered to the anode and/or a reforming stage associated with the anode. The "fuel cell heating value utilization" as used herein can be computed using the flow rates and Lower Heating Value (LHV) of the fuel components entering and leaving the fuel cell anode. As such, fuel cell heating value utilization can be computed as (LHV(anode_in)−LHV(anode_out))/LHV (anode_in), where LHV(anode_in) and LHV(anode_out) refer to the LHV of the fuel components (such as $H_2$, $CH_4$, and/or CO) in the anode inlet and outlet streams or flows, respectively. In this definition, the LHV of a stream or flow may be computed as a sum of values for each fuel component in the input and/or output stream. The contribution of each fuel component to the sum can correspond to the fuel component's flow rate (e.g., mol/hr) multiplied by the fuel component's LHV (e.g., joules/mol).

Lower Heating Value: The lower heating value is defined as the enthalpy of combustion of a fuel component to vapor phase, fully oxidized products (i.e., vapor phase $CO_2$ and $H_2O$ product). For example, any $CO_2$ present in an anode input stream does not contribute to the fuel content of the anode input, since $CO_2$ is already fully oxidized. For this definition, the amount of oxidation occurring in the anode due to the anode fuel cell reaction is defined as oxidation of $H_2$ in the anode as part of the electrochemical reaction in the anode, as defined above.

It is noted that, for the special case where the only fuel in the anode input flow is $H_2$, the only reaction involving a fuel component that can take place in the anode represents the conversion of $H_2$ into $H_2O$. In this special case, the fuel utilization simplifies to ($H_2$-rate-in minus $H_2$-rate-out)/$H_2$-rate-in. In such a case, $H_2$ would be the only fuel component, and so the $H_2$ LHV would cancel out of the equation. In the more general case, the anode feed may contain, for example, $CH_4$, $H_2$, and CO in various amounts. Because these species can typically be present in different amounts in the anode outlet, the summation as described above can be needed to determine the fuel utilization.

Alternatively or in addition to fuel utilization, the utilization for other reactants in the fuel cell can be characterized. For example, the operation of a fuel cell can additionally or alternately be characterized with regard to "$CO_2$ utilization" and/or "oxidant" utilization. The values for $CO_2$ utilization and/or oxidant utilization can be specified in a similar manner.

Electrical efficiency: As used herein, the term "electrical efficiency" ("EE") is defined as the electrochemical power produced by the fuel cell divided by the rate of Lower Heating Value ("LHV") of fuel input to the fuel cell. The fuel inputs to the fuel cell includes both fuel delivered to the anode as well as any fuel used to maintain the temperature of the fuel cell, such as fuel delivered to a burner associated with a fuel cell. In this description, the power produced by the fuel may be described in terms of LHV(el) fuel rate.

Electrochemical power: As used herein, the term "electrochemical power" or LHV(el) is the power generated by the circuit connecting the cathode to the anode in the fuel cell and the transfer of carbonate ions across the fuel cell's electrolyte. Electrochemical power excludes power produced or consumed by equipment upstream or downstream from the fuel cell. For example, electricity produced from heat in a fuel cell exhaust stream is not considered part of the electrochemical power. Similarly, power generated by a gas turbine or other equipment upstream of the fuel cell is not part of the electrochemical power generated. The "electrochemical power" does not take electrical power consumed during operation of the fuel cell into account, or any loss incurred by conversion of the direct current to alternating current. In other words, electrical power used to supply the fuel cell operation or otherwise operate the fuel cell is not subtracted from the direct current power produced by the fuel cell. As used herein, the power density is the current density multiplied by voltage. As used herein, the total fuel cell power is the power density multiplied by the fuel cell area.

Fuel inputs: As used herein, the term "anode fuel input," designated as LHV(anode_in), is the amount of fuel within the anode inlet stream. The term "fuel input", designated as LHV(in), is the total amount of fuel delivered to the fuel cell, including both the amount of fuel within the anode inlet stream and the amount of fuel used to maintain the temperature of the fuel cell. The fuel may include both reformable and nonreformable fuels, based on the definition of a reformable fuel provided herein. Fuel input is not the same as fuel utilization.

Total fuel cell efficiency: As used herein, the term "total fuel cell efficiency" ("TFCE") is defined as: the electrochemical power generated by the fuel cell, plus the rate of LHV of syngas produced by the fuel cell, divided by the rate of LHV of fuel input to the anode. In other words, TFCE=(LHV(el)+LHV(sg net))/LHV(anode_in), where LHV(anode_in) refers to rate at which the LHV of the fuel components (such as $H_2$, $CH_4$, and/or CO) delivered to the anode and LHV(sg net) refers to a rate at which syngas ($H_2$, CO) is produced in the anode, which is the difference between syngas input to the anode and syngas output from the anode. LHV(el) describes the electrochemical power generation of the fuel cell. The total fuel cell efficiency excludes heat generated by the fuel cell that is put to beneficial use outside of the fuel cell. In operation, heat generated by the fuel cell may be put to beneficial use by downstream equipment. For example, the heat may be used to generate additional electricity or to heat water. These uses, when they occur apart from the fuel cell, are not part of the total fuel cell efficiency, as the term is used in this application. The total fuel cell efficiency is for the fuel cell operation only, and does not include power production, or consumption, upstream, or downstream, of the fuel cell.

Chemical efficiency: As used herein, the term "chemical efficiency", is defined as the lower heating value of $H_2$ and CO in the anode exhaust of the fuel cell, or LHV(sg out), divided by the fuel input, or LHV(in).

Neither the electrical efficiency nor the total system efficiency takes the efficiency of upstream or downstream processes into consideration. For example, it may be advantageous to use turbine exhaust as a source of $CO_2$ for the fuel cell cathode. In this arrangement, the efficiency of the turbine is not considered as part of the electrical efficiency or the total fuel cell efficiency calculation. Similarly, outputs from the fuel cell may be recycled as inputs to the fuel cell. A recycle loop is not considered when calculating electrical efficiency or the total fuel cell efficiency in single pass mode.

Syngas produced: As used herein, the term "syngas produced" is the difference between syngas input to the anode and syngas output from the anode. Syngas may be used as an input, or fuel, for the anode, at least in part. For example, a system may include an anode recycle loop that returns syngas from the anode exhaust to the anode inlet where it is supplemented with natural gas or other suitable fuel. Syngas produced LHV (sg net)=(LHV(sg out)−LHV(sg in)), where LHV(sg in) and LHV(sg out) refer to the LHV of the syngas in the anode inlet and syngas in the anode outlet streams or flows, respectively. It is noted that at least a portion of the syngas produced by the reforming reactions within an anode can typically be utilized in the anode to produce electricity. The hydrogen utilized to produce electricity is not included in the definition of "syngas produced" because it does not exit the anode. As used herein, the term "syngas ratio" is the LHV of the net syngas produced divided by the LHV of the fuel input to the anode or LHV (sg net)/LHV(anode in). Molar flow rates of syngas and fuel can be used instead of LHV to express a molar-based syngas ratio and a molar-based syngas produced.

Steam to carbon ratio (S/C): As used herein, the steam to carbon ratio (S/C) is the molar ratio of steam in a flow to reformable carbon in the flow. Carbon in the form of CO and $CO_2$ are not included as reformable carbon in this definition. The steam to carbon ratio can be measured and/or controlled at different points in the system. For example, the composition of an anode inlet stream can be manipulated to achieve a S/C that is suitable for reforming in the anode. The S/C can be given as the molar flow rate of $H_2O$ divided by the product of the molar flow rate of fuel multiplied by the number of carbon atoms in the fuel, e.g. one for methane. Thus, S/C=$f_{H2O}/(f_{CH4} \times \# C)$, where $f_{H2O}$ is the molar flow rate of water, where $f_{CH4}$ is the molar flow rate of methane (or other fuel) and # C is the number of carbons in the fuel.

Fuel Cell and Fuel Cell Components: In this discussion, a fuel cell can correspond to a single cell, with an anode and a cathode separated by an electrolyte. The anode and cathode can receive input gas flows to facilitate the respective anode and cathode reactions for transporting charge across the electrolyte and generating electricity. A fuel cell stack can represent a plurality of cells in an integrated unit. Although a fuel cell stack can include multiple fuel cells, the fuel cells can typically be connected in parallel and can function (approximately) as if they collectively represented a single fuel cell of a larger size. When an input flow is delivered to the anode or cathode of a fuel cell stack, the fuel stack can include flow channels for dividing the input flow between each of the cells in the stack and flow channels for combining the output flows from the individual cells. In this discussion, a fuel cell array can be used to refer to a plurality of fuel cells (such as a plurality of fuel cell stacks) that are arranged in series, in parallel, or in any other convenient manner (e.g., in a combination of series and parallel). A fuel cell array can include one or more stages of fuel cells and/or fuel cell stacks, where the anode/cathode output from a first stage may serve as the anode/cathode input for a second stage. It is noted that the anodes in a fuel cell array do not have to be connected in the same way as the cathodes in the array. For convenience, the input to the first anode stage of a fuel cell array may be referred to as the anode input for the array, and the input to the first cathode stage of the fuel cell array may be referred to as the cathode input to the array. Similarly, the output from the final anode/cathode stage may be referred to as the anode/cathode output from the array.

It should be understood that reference to use of a fuel cell herein typically denotes a "fuel cell stack" composed of individual fuel cells, and more generally refers to use of one or more fuel cell stacks in fluid communication. Individual fuel cell elements (plates) can typically be "stacked" together in a rectangular array called a "fuel cell stack". This fuel cell stack can typically take a feed stream and distribute reactants among all of the individual fuel cell elements and can then collect the products from each of these elements. When viewed as a unit, the fuel cell stack in operation can be taken as a whole even though composed of many (often tens or hundreds) of individual fuel cell elements. These individual fuel cell elements can typically have similar voltages (as the reactant and product concentrations are similar), and the total power output can result from the summation of all of the electrical currents in all of the cell elements, when the elements are electrically connected in series. Stacks can also be arranged in a series arrangement to produce high voltages. A parallel arrangement can boost the current. If a sufficiently large volume fuel cell stack is available to process a given exhaust flow, the systems and methods described herein can be used with a single molten carbonate fuel cell stack. In other aspects of the invention, a plurality of fuel cell stacks may be desirable or needed for a variety of reasons.

For the purposes of this invention, unless otherwise specified, the term "fuel cell" should be understood to also refer to and/or is defined as including a reference to a fuel cell stack composed of set of one or more individual fuel cell elements for which there is a single input and output, as that is the manner in which fuel cells are typically employed in practice. Similarly, the term fuel cells (plural), unless otherwise specified, should be understood to also refer to and/or is defined as including a plurality of separate fuel cell stacks. In other words, all references within this document, unless specifically noted, can refer interchangeably to the operation of a fuel cell stack as a "fuel cell". For example, the volume of exhaust generated by a commercial scale combustion generator may be too large for processing by a fuel cell (i.e., a single stack) of conventional size. In order to process the full exhaust, a plurality of fuel cells (i.e., two or more separate fuel cells or fuel cell stacks) can be arranged in parallel, so that each fuel cell can process (roughly) an equal portion of the combustion exhaust. Although multiple fuel cells can be used, each fuel cell can typically be operated in a generally similar manner, given its (roughly) equal portion of the combustion exhaust.

"Internal reforming" and "external reforming": A fuel cell or fuel cell stack may include one or more internal reforming sections. As used herein, the term "internal reforming" refers to fuel reforming occurring within the body of a fuel cell, a fuel cell stack, or otherwise within a fuel cell assembly. External reforming, which is often used in conjunction with a fuel cell, occurs in a separate piece of equipment that is located outside of the fuel cell stack. In other words, the body of the external reformer is not in direct physical contact with the body of a fuel cell or fuel cell stack. In a typical set up, the output from the external reformer can be fed to the anode inlet of a fuel cell. Unless otherwise noted specifically, the reforming described within this application is internal reforming.

Internal reforming may occur within a fuel cell anode. Internal reforming can additionally or alternately occur within an internal reforming element integrated within a fuel cell assembly. The integrated reforming element may be located between fuel cell elements within a fuel cell stack. In other words, one of the trays in the stack can be a reforming section instead of a fuel cell element. In one aspect, the flow arrangement within a fuel cell stack directs fuel to the internal reforming elements and then into the anode portion of the fuel cells. Thus, from a flow perspective, the internal reforming elements and fuel cell elements can be arranged in series within the fuel cell stack. As used herein, the term "anode reforming" is fuel reforming that occurs within an anode. As used herein, the term "internal reforming" is reforming that occurs within an integrated reforming element and not in an anode section.

In some aspects, a reforming stage that is internal to a fuel cell assembly can be considered to be associated with the anode(s) in the fuel cell assembly. In some alternative aspects, for a reforming stage in a fuel cell stack that can be associated with an anode (such as associated with multiple anodes), a flow path can be available so that the output flow from the reforming stage is passed into at least one anode. This can correspond to having an initial section of a fuel cell plate that is not in contact with the electrolyte and instead serves just as a reforming catalyst. Another option for an associated reforming stage can be to have a separate integrated reforming stage as one of the elements in a fuel cell stack, where the output from the integrated reforming stage is returned to the input side of one or more of the fuel cells in the fuel cell stack.

From a heat integration standpoint, a characteristic height in a fuel cell stack can be the height of an individual fuel cell stack element. It is noted that the separate reforming stage or a separate endothermic reaction stage could have a different height in the stack than a fuel cell. In such a scenario, the height of a fuel cell element can be used as the characteristic height. In some aspects, an integrated endothermic reaction stage can be defined as a stage that is heat integrated with one or more fuel cells, so that the integrated endothermic reaction stage can use the heat from the fuel cells as a heat source for reforming. Such an integrated endothermic reaction stage can be defined as being positioned less than 5 times the height of a stack element from any fuel cells providing heat to the integrated stage. For example, an integrated endothermic reaction stage (such as a reforming stage) can be positioned less than 5 times the height of a stack element from any fuel cells that are heat integrated, such as less than 3 times the height of a stack element. In this discussion, an integrated reforming stage or integrated endothermic reaction stage that represents an adjacent stack element to a fuel cell element can be defined as being about one stack element height or less away from the adjacent fuel cell element.

In some aspects, a separate reforming stage that is heat integrated with a fuel cell element can also correspond to a reforming stage that is associated with the fuel cell element. In such aspects, an integrated fuel cell element can provide at least a portion of the heat to the associated reforming stage, and the associated reforming stage can provide at least a portion of the reforming stage output to the integrated fuel cell as a fuel stream. In other aspects, a separate reforming stage can be integrated with a fuel cell for heat transfer without being associated with the fuel cell. In this type of situation, the separate reforming stage can receive heat from the fuel cell, but the output of the reforming stage is not used as an input to the fuel cell. Instead, the output of such a reforming stage can be used for another purpose, such as directly adding the output to the anode exhaust stream, or for forming a separate output stream from the fuel cell assembly.

More generally, a separate stack element in a fuel cell stack can be used to perform any convenient type of endothermic reaction that can take advantage of the waste heat provided by integrated fuel cell stack elements. Instead of plates suitable for performing a reforming reaction on a hydrocarbon fuel stream, a separate stack element can have plates suitable for catalyzing another type of endothermic reaction. A manifold or other arrangement of inlet manifolds in the fuel cell stack can be used to provide an appropriate input flow to each stack element. A similar manifold or other arrangement of outlet manifolds can also be used to withdraw the output flows from each stack element. Optionally, the output flows from a endothermic reaction stage in a stack can be withdrawn from the fuel cell stack without having the output flow pass through a fuel cell anode. In such an optional aspect, the products of the exothermic reaction will therefore exit from the fuel cell stack without passing through a fuel cell anode. Examples of other types of endothermic reactions that can be performed in stack elements in a fuel cell stack include ethanol dehydration to form ethylene and ethane cracking.

Recycle: As defined herein, recycle of a portion of a fuel cell output (such as an anode exhaust or a stream separated or withdrawn from an anode exhaust) to a fuel cell inlet can correspond to a direct or indirect recycle stream. A direct recycle of a stream to a fuel cell inlet is defined as recycle of the stream without passing through an intermediate process, while an indirect recycle involves recycle after passing a stream through one or more intermediate processes. For example, if the anode exhaust is passed through a $CO_2$ separation stage prior to recycle, this is considered an indirect recycle of the anode exhaust. If a portion of the anode exhaust, such as an $H_2$ stream withdrawn from the anode exhaust, is passed into a gasifier for converting coal into a fuel suitable for introduction into the fuel cell, then that is also considered an indirect recycle.

Anode Inputs and Outputs

In various aspects of the invention, the MCFC array can be fed by a fuel received at the anode inlet that comprises, for example, both hydrogen and a hydrocarbon such as methane (or alternatively a hydrocarbonaceous or hydrocarbon-like compound that may contain heteroatoms different from C and H). Most of the methane (or other hydrocarbonaceous or hydrocarbon-like compound) fed to the anode can typically be fresh methane. In this description, a fresh fuel such as fresh methane refers to a fuel that is not recycled from another fuel cell process. For example, methane recycled from the anode outlet stream back to the anode inlet may not be considered "fresh" methane, and can instead be described as reclaimed methane. The fuel source used can be shared with other components, such as a turbine that uses a portion of the fuel source to provide a $CO_2$-containing stream for the cathode input. The fuel source input can include water in a proportion to the fuel appropriate for reforming the hydrocarbon (or hydrocarbon-like) compound in the reforming section that generates hydrogen. For example, if methane is the fuel input for reforming to generate $H_2$, the molar ratio of water to fuel can be from about one to one to about ten to one, such as at least about two to one. A ratio of four to one or greater is typical for external reforming, but lower values can be typical for internal reforming. To the degree that $H_2$ is a portion of the fuel source, in some optional aspects no additional water may be needed in the fuel, as the oxidation of $H_2$ at the anode can tend to produce $H_2O$ that can be used for reforming the fuel. The fuel source can also optionally contain components incidental to the fuel source (e.g., a natural gas feed can contain some content of $CO_2$ as an additional component). For example, a natural gas feed can contain $CO_2$, $N_2$, and/or other inert (noble) gases as additional components. Optionally, in some aspects the fuel source may also contain CO, such as CO from a recycled portion of the anode exhaust. An additional or alternate potential source for CO in the fuel into a fuel cell assembly can be CO generated by steam reforming of a hydrocarbon fuel performed on the fuel prior to entering the fuel cell assembly.

More generally, a variety of types of fuel streams may be suitable for use as an input stream for the anode of a molten carbonate fuel cell. Some fuel streams can correspond to streams containing hydrocarbons and/or hydrocarbon-like compounds that may also include heteroatoms different from C and H. In this discussion, unless otherwise specified, a reference to a fuel stream containing hydrocarbons for an MCFC anode is defined to include fuel streams containing such hydrocarbon-like compounds. Examples of hydrocarbon (including hydrocarbon-like) fuel streams include natural gas, streams containing C1-C4 carbon compounds (such as methane or ethane), and streams containing heavier C5+ hydrocarbons (including hydrocarbon-like compounds), as well as combinations thereof. Still other additional or alternate examples of potential fuel streams for use in an anode input can include biogas-type streams, such as methane produced from natural (biological) decomposition of organic material.

In some aspects, a molten carbonate fuel cell can be used to process an input fuel stream, such as a natural gas and/or hydrocarbon stream, with a low energy content due to the presence of diluent compounds. For example, some sources of methane and/or natural gas are sources that can include substantial amounts of either $CO_2$ or other inert molecules, such as nitrogen, argon, or helium. Due to the presence of elevated amounts of $CO_2$ and/or inerts, the energy content of a fuel stream based on the source can be reduced. Using a low energy content fuel for a combustion reaction (such as for powering a combustion-powered turbine) can pose difficulties. However, a molten carbonate fuel cell can generate power based on a low energy content fuel source with a reduced or minimal impact on the efficiency of the fuel cell. The presence of additional gas volume can require additional heat for raising the temperature of the fuel to the temperature for reforming and/or the anode reaction. Additionally, due to the equilibrium nature of the water gas shift reaction within a fuel cell anode, the presence of additional $CO_2$ can have an impact on the relative amounts of $H_2$ and CO present in the anode output. However, the inert compounds otherwise can have only a minimal direct impact on the reforming and anode reactions. The amount of $CO_2$ and/or inert compounds in a fuel stream for a molten carbonate fuel cell, when present, can be at least about 1 vol %, such as at least about 2 vol %, or at least about 5 vol %, or at least about 10 vol %, or at least about 15 vol %, or at least about 20 vol %, or at least about 25 vol %, or at least about 30 vol %, or at least about 35 vol %, or at least about 40 vol %, or at least about 45 vol %, or at least about 50 vol %, or at least about 75 vol %. Additionally or alternately, the amount of $CO_2$ and/or inert compounds in a fuel stream for a molten carbonate fuel cell can be about 90 vol % or less, such as about 75 vol % or less, or about 60 vol % or less, or about 50 vol % or less, or about 40 vol % or less, or about 35 vol % or less.

Yet other examples of potential sources for an anode input stream can correspond to refinery and/or other industrial process output streams. For example, coking is a common process in many refineries for converting heavier compounds to lower boiling ranges. Coking typically produces an off-gas containing a variety of compounds that are gases at room temperature, including CO and various C1-C4 hydrocarbons. This off-gas can be used as at least a portion of an anode input stream. Other refinery off-gas streams can additionally or alternatively be suitable for inclusion in an anode input stream, such as light ends (C1-C4) generated during cracking or other refinery processes. Still other suitable refinery streams can additionally or alternatively include refinery streams containing CO or $CO_2$ that also contain $H_2$ and/or reformable fuel compounds.

Still other potential sources for an anode input can additionally or alternatively include streams with increased water content. For example, an ethanol output stream from an ethanol plant (or another type of fermentation process) can include a substantial portion of $H_2O$ prior to final distillation. Such $H_2O$ can typically cause only minimal impact on the operation of a fuel cell. Thus, a fermentation mixture of alcohol (or other fermentation product) and water can be used as at least a portion of an anode input stream.

Biogas, or digester gas, is another additional or alternate potential source for an anode input. Biogas may primarily comprise methane and $CO_2$ and is typically produced by the breakdown or digestion of organic matter. Anaerobic bacteria may be used to digest the organic matter and produce the biogas. Impurities, such as sulfur-containing compounds, may be removed from the biogas prior to use as an anode input.

The output stream from an MCFC anode can include $H_2O$, $CO_2$, CO, and $H_2$. Optionally, the anode output stream could also have unreacted fuel (such as $H_2$ or $CH_4$) or inert compounds in the feed as additional output components. Instead of using this output stream as a fuel source to provide heat for a reforming reaction or as a combustion fuel for heating the cell, one or more separations can be performed on the anode output stream to separate the $CO_2$ from the components with potential value as inputs to another process, such as $H_2$ or CO. The $H_2$ and/or CO can be used as a syngas for chemical synthesis, as a source of hydrogen for chemical reaction, and/or as a fuel with reduced greenhouse gas emissions.

In various aspects, the composition of the output stream from the anode can be impacted by several factors. Factors that can influence the anode output composition can include the composition of the input stream to the anode, the amount of current generated by the fuel cell, and/or the temperature at the exit of the anode. The temperature of at the anode exit can be relevant due to the equilibrium nature of the water gas shift reaction. In a typical anode, at least one of the plates forming the wall of the anode can be suitable for catalyzing the water gas shift reaction. As a result, if a) the composition of the anode input stream is known, b) the extent of reforming of reformable fuel in the anode input stream is known, and c) the amount of carbonate transported from the cathode to anode (corresponding to the amount of electrical current generated) is known, the composition of the anode output can be determined based on the equilibrium constant for the water gas shift reaction.

$$K_{eq}=[CO_2][H_2]/[CO][H_2O]$$

In the above equation, $K_{eq}$ is the equilibrium constant for the reaction at a given temperature and pressure, and [X] is the partial pressure of component X. Based on the water gas shift reaction, it can be noted that an increased $CO_2$ concentration in the anode input can tend to result in additional CO formation (at the expense of $H_2$) while an increased $H_2O$ concentration can tend to result in additional $H_2$ formation (at the expense of CO).

To determine the composition at the anode output, the composition of the anode input can be used as a starting point. This composition can then be modified to reflect the extent of reforming of any reformable fuels that can occur within the anode. Such reforming can reduce the hydrocarbon content of the anode input in exchange for increased hydrogen and $CO_2$. Next, based on the amount of electrical current generated, the amount of $H_2$ in the anode input can be reduced in exchange for additional $H_2O$ and $CO_2$. This composition can then be adjusted based on the equilibrium constant for the water gas shift reaction to determine the exit concentrations for $H_2$, CO, $CO_2$, and $H_2O$.

Table 1 shows the anode exhaust composition at different fuel utilizations for a typical type of fuel. The anode exhaust composition can reflect the combined result of the anode reforming reaction, water gas shift reaction, and the anode oxidation reaction. The output composition values in Table 1 were calculated by assuming an anode input composition with an about 2 to 1 ratio of steam ($H_2O$) to carbon (reformable fuel). The reformable fuel was assumed to be methane, which was assumed to be 100% reformed to hydrogen. The initial $CO_2$ and $H_2$ concentrations in the anode input were assumed to be negligible, while the input $N_2$ concentration was about 0.5%. The fuel utilization $U_f$ (as defined herein) was allowed to vary from about 35% to about 70% as shown in the table. The exit temperature for the fuel cell anode was assumed to be about 650° C. for purposes of determining the correct value for the equilibrium constant.

TABLE 1

| $U_f$ | % | 35% | 40% | 45% | 50% | 55% | 60% | 65% | 70% |
|---|---|---|---|---|---|---|---|---|---|
| | | | | Anode Exhaust Composition | | | | | |
| $H_2O$ | %, wet | 32.5% | 34.1% | 35.5% | 36.7% | 37.8% | 38.9% | 39.8% | 40.5% |
| $CO_2$ | %, wet | 26.7% | 29.4% | 32.0% | 34.5% | 36.9% | 39.3% | 41.5% | 43.8% |
| $H_2$ | %, wet | 29.4% | 26.0% | 22.9% | 20.0% | 17.3% | 14.8% | 12.5% | 10.4% |
| CO | %, wet | 10.8% | 10.0% | 9.2% | 8.4% | 7.5% | 6.7% | 5.8% | 4.9% |
| $N_2$ | %, wet | 0.5% | 0.5% | 0.5% | 0.4% | 0.4% | 0.4% | 0.4% | 0.4% |
| $CO_2$ | %, dry | 39.6% | 44.6% | 49.6% | 54.5% | 59.4% | 64.2% | 69.0% | 73.7% |
| $H_2$ | %, dry | 43.6% | 39.4% | 35.4% | 31.5% | 27.8% | 24.2% | 20.7% | 17.5% |
| CO | %, dry | 16.1% | 15.2% | 14.3% | 13.2% | 12.1% | 10.9% | 9.7% | 8.2% |
| $N_2$ | %, dry | 0.7% | 0.7% | 0.7% | 0.7% | 0.7% | 0.7% | 0.7% | 0.7% |
| $H_2$/CO | | 2.7 | 2.6 | 2.5 | 2.4 | 2.3 | 2.2 | 2.1 | 2.1 |
| ($H_2$—$CO_2$)/(CO + $CO_2$) | | 0.07 | −0.09 | −0.22 | −0.34 | −0.44 | −0.53 | −0.61 | −0.69 |

Table 1 shows anode output compositions for a particular set of conditions and anode input composition. More generally, in various aspects the anode output can include about 10 vol % to about 50 vol % $H_2O$. The amount of $H_2O$ can vary greatly, as $H_2O$ in the anode can be produced by the anode oxidation reaction. If an excess of $H_2O$ beyond what is needed for reforming is introduced into the anode, the excess $H_2O$ can typically pass through largely unreacted, with the exception of $H_2O$ consumed (or generated) due to fuel reforming and the water gas shift reaction. The $CO_2$ concentration in the anode output can also vary widely, such as from about 20 vol % to about 50 vol % $CO_2$. The amount of $CO_2$ can be influenced by both the amount of electrical current generated as well as the amount of $CO_2$ in the anode input flow. The amount of $H_2$ in the anode output can additionally or alternately be from about 10 vol % $H_2$ to about 50 vol % $H_2$, depending on the fuel utilization in the anode. At the anode output, the amount of CO can be from about 5 vol % to about 20 vol %. It is noted that the amount of CO relative to the amount of $H_2$ in the anode output for a given fuel cell can be determined in part by the equilibrium constant for the water gas shift reaction at the temperature and pressure present in the fuel cell. The anode output can further additionally or alternately include 5 vol % or less of various other components, such as $N_2$, $CH_4$ (or other unreacted carbon-containing fuels), and/or other components.

Optionally, one or more water gas shift reaction stages can be included after the anode output to convert CO and $H_2O$ in the anode output into $CO_2$ and $H_2$, if desired. The amount of $H_2$ present in the anode output can be increased, for example, by using a water gas shift reactor at lower temperature to convert $H_2O$ and CO present in the anode output into $H_2$ and $CO_2$. Alternatively, the temperature can be raised and the water-gas shift reaction can be reversed, producing more CO and $H_2O$ from $H_2$ and $CO_2$. Water is an expected output of the reaction occurring at the anode, so the anode output can typically have an excess of $H_2O$ relative to the amount of CO present in the anode output. Alternatively, $H_2O$ can be added to the stream after the anode exit but before the water gas shift reaction. CO can be present in the anode output due to incomplete carbon conversion during reforming and/or due to the equilibrium balancing reactions between $H_2O$, CO, $H_2$, and $CO_2$ (i.e., the water-gas shift equilibrium) under either reforming conditions or the conditions present during the anode reaction. A water gas shift reactor can be operated under conditions to drive the equilibrium further in the direction of forming $CO_2$ and $H_2$ at the expense of CO and $H_2O$. Higher temperatures can tend to favor the formation of CO and $H_2O$. Thus, one option for operating the water gas shift reactor can be to expose the anode output stream to a suitable catalyst, such as a catalyst including iron oxide, zinc oxide, copper on zinc oxide, or the like, at a suitable temperature, e.g., between about 190° C. to about 210° C. Optionally, the water-gas shift reactor can include two stages for reducing the CO concentration in an anode output stream, with a first higher temperature stage operated at a temperature from at least about 300° C. to about 375° C. and a second lower temperature stage operated at a temperature of about 225° C. or less, such as from about 122° C. to about 210° C. In addition to increasing the amount of $H_2$ present in the anode output, the water-gas shift reaction can additionally or alternately increase the amount of $CO_2$ at the expense of CO. This can exchange difficult-to-remove carbon monoxide (CO) for carbon dioxide, which can be more readily removed by condensation (e.g., cryogenic removal), chemical reaction (such as amine removal), and/or other $CO_2$ removal methods. Additionally or alternately, it may be desirable to increase the CO content presein the anode exhaust in order to achieve a desired ratio of $H_2$ to CO.

After passing through the optional water gas shift reaction stage, the anode output can be passed through one or more separation stages for removal of water and/or $CO_2$ from the anode output stream. For example, one or more $CO_2$ output streams can be formed by performing $CO_2$ separation on the anode output using one or more methods individually or in combination. Such methods can be used to generate $CO_2$ output stream(s) having a $CO_2$ content of 90 vol % or greater, such as at least 95 vol % $CO_2$, or at least 98 vol % $CO_2$. Such methods can recover about at least about 70% of the $CO_2$ content of the anode output, such as at least about 80% of the $CO_2$ content of the anode output, or at least about 90%. Alternatively, in some aspects it may be desirable to recover only a portion of the $CO_2$ within an anode output stream, with the recovered portion of $CO_2$ being about 33% to about 90% of the $CO_2$ in the anode output, such as at least about 40%, or at least about 50%. For example, it may be desirable to retain some $CO_2$ in the anode output flow so that a desired composition can be achieved in a subsequent water gas shift stage. Suitable separation methods may comprise use of a physical solvent (e.g., Selexol™ or Rectisol™); amines or other bases (e.g., MEA or MDEA); refrigeration (e.g., cryogenic separation); pressure swing adsorption; vacuum swing adsorption; and combinations thereof. A cryogenic $CO_2$ separator can be an example of a suitable separator. As the anode output is cooled, the majority of the water in the anode output can be separated out as a condensed (liquid) phase. Further cooling and/or pressurizing of the water-depleted anode output flow can then separate high purity $CO_2$, as the other remaining components in the anode output flow (such as $H_2$, $N_2$, $CH_4$) do not tend to readily form condensed phases. A cryogenic $CO_2$ separator can recover between about 33% and about 90% of the $CO_2$ present in a flow, depending on the operating conditions.

Removal of water from the anode exhaust to form one or more water output streams can also be beneficial, whether prior to, during, or after performing $CO_2$ separation. The amount of water in the anode output can vary depending on operating conditions selected. For example, the steam-to-carbon ratio established at the anode inlet can affect the water content in the anode exhaust, with high steam-to-carbon ratios typically resulting in a large amount of water that can pass through the anode unreacted and/or reacted only due to the water gas shift equilibrium in the anode. Depending on the aspect, the water content in the anode exhaust can correspond to up to about 30% or more of the volume in the anode exhaust. Additionally or alternately, the water content can be about 80% or less of the volume of the anode exhaust. While such water can be removed by compression and/or cooling with resulting condensation, the removal of this water can require extra compressor power and/or heat exchange surface area and excessive cooling water. One beneficial way to remove a portion of this excess water can be based on use of an adsorbent bed that can capture the humidity from the moist anode effluent and can then be 'regenerated' using dry anode feed gas, in order to provide additional water for the anode feed. HVAC-style (heating, ventilation, and air conditioning) adsorption wheels design can be applicable, because anode exhaust and inlet can be similar in pressure, and minor leakage from one stream to the other can have minimal impact on the overall process. In embodiments where $CO_2$ removal is performed using a cryogenic process, removal of water prior to or during $CO_2$ removal may be desirable, including removal by triethyleneglycol (TEG) system and/or desiccants. By contrast, if an amine wash is used for $CO_2$ removal, water can be removed from the anode exhaust downstream from the $CO_2$ removal stage.

Alternately or in addition to a $CO_2$ output stream and/or a water output stream, the anode output can be used to form one or more product streams containing a desired chemical or fuel product. Such a product stream or streams can correspond to a syngas stream, a hydrogen stream, or both syngas product and hydrogen product streams. For example, a hydrogen product stream containing at least about 70 vol % $H_2$, such as at least about 90 vol % $H_2$ or at least about 95 vol % $H_2$, can be formed. Additionally or alternately, a syngas stream containing at least about 70 vol % of $H_2$ and CO combined, such as at least about 90 vol % of $H_2$ and CO can be formed. The one or more product streams can have a gas volume corresponding to at least about 75% of the combined $H_2$ and CO gas volumes in the anode output, such as at least about 85% or at least about 90% of the combined $H_2$ and CO gas volumes. It is noted that the relative amounts of $H_2$ and CO in the products streams may differ from the $H_2$ to CO ratio in the anode output based on use of water gas shift reaction stages to convert between the products.

In some aspects, it can be desirable to remove or separate a portion of the $H_2$ present in the anode output. For example, in some aspects the $H_2$ to CO ratio in the anode exhaust can be at least about 3.0:1. By contrast, processes that make use of syngas, such as Fischer-Tropsch synthesis, may consume $H_2$ and CO in a different ratio, such as a ratio that is closer to 2:1. One alternative can be to use a water gas shift reaction to modify the content of the anode output to have an $H_2$ to CO ratio closer to a desired syngas composition. Another alternative can be to use a membrane separation to remove a portion of the $H_2$ present in the anode output to achieve a desired ratio of $H_2$ and CO, or still alternately to use a combination of membrane separation and water gas shift reactions. One advantage of using a membrane separation to remove only a portion of the $H_2$ in the anode output can be that the desired separation can be performed under relatively mild conditions. Since one goal can be to produce a retentate that still has a substantial $H_2$ content, a permeate of high purity hydrogen can be generated by membrane separation without requiring severe conditions. For example, rather than having a pressure on the permeate side of the membrane of about 100 kPa or less (such as ambient pressure), the permeate side can be at an elevated pressure relative to ambient while still having sufficient driving force to perform the membrane separation. Additionally or alternately, a sweep gas such as methane can be used to provide a driving force for the membrane separation. This can reduce the purity of the $H_2$ permeate stream, but may be advantageous, depending on the desired use for the permeate stream.

In various aspects of the invention, at least a portion of the anode exhaust stream (preferably after separation of $CO_2$ and/or $H_2O$) can be used as a feed for a process external to the fuel cell and associated reforming stages. In various aspects, the anode exhaust can have a ratio of $H_2$ to CO of about 1.5:1 to about 10:1, such as at least about 3.0:1, or at least about 4.0:1, or at least about 5.0:1. A syngas stream can be generated or withdrawn from the anode exhaust. The anode exhaust gas, optionally after separation of $CO_2$ and/or $H_2O$, and optionally after performing a water gas shift reaction and/or a membrane separation to remove excess hydrogen, can correspond to a stream containing substantial portions of $H_2$ and/or CO. For a stream with a relatively low content of CO, such as a stream where the ratio of $H_2$ to CO is at least about 3:1, the anode exhaust can be suitable for use as an $H_2$ feed. Examples of processes that could benefit from an $H_2$ feed can include, but are not limited to, refinery processes, an ammonia synthesis plant, or a turbine in a (different) power generation system, or combinations thereof. Depending on the application, still lower $CO_2$ contents can be desirable. For a stream with an $H_2$-to-CO ratio of less than about 2.2 to 1 and greater than about 1.9 to 1, the stream can be suitable for use as a syngas feed. Examples of processes that could benefit from a syngas feed can include, but are not limited to, a gas-to-liquids plant (such as a plant using a Fischer-Tropsch process with a non-shifting catalyst) and/or a methanol synthesis plant. The amount of the anode exhaust used as a feed for an external process can be any convenient amount. Optionally, when a portion of the anode exhaust is used as a feed for an external process, a second portion of the anode exhaust can be recycled to the anode input and/or recycled to the combustion zone for a combustion-powered generator.

The input streams useful for different types of Fischer-Tropsch synthesis processes can provide an example of the different types of product streams that may be desirable to generate from the anode output. For a Fischer-Tropsch synthesis reaction system that uses a shifting catalyst, such as an iron-based catalyst, the desired input stream to the reaction system can include $CO_2$ in addition to $H_2$ and CO. If a sufficient amount of $CO_2$ is not present in the input stream, a Fischer-Tropsch catalyst with water gas shift activity can consume CO in order to generate additional $CO_2$, resulting in a syngas that can be deficient in CO. For integration of such a Fischer-Tropsch process with an MCFC fuel cell, the separation stages for the anode output can be operated to retain a desired amount of $CO_2$ (and optionally $H_2O$) in the syngas product. By contrast, for a Fischer-Tropsch catalyst based on a non-shifting catalyst, any $CO_2$ present in a product stream could serve as an inert component in the Fischer-Tropsch reaction system.

In an aspect where the membrane is swept with a sweep gas such as a methane sweep gas, the methane sweep gas can correspond to a methane stream used as the anode fuel or in a different low pressure process, such as a boiler, furnace, gas turbine, or other fuel-consuming device. In such an aspect, low levels of $CO_2$ permeation across the membrane can have minimal consequence. Such $CO_2$ that may permeate across the membrane can have a minimal impact on the reactions within the anode, and such $CO_2$ can remain contained in the anode product. Therefore, the $CO_2$ (if any) lost across the membrane due to permeation does not need to be transferred again across the MCFC electrolyte. This can significantly reduce the separation selectivity requirement for the hydrogen permeation membrane. This can allow, for example, use of a higher-permeability membrane having a lower selectivity, which can enable use of a lower pressure and/or reduced membrane surface area. In such an aspect of the invention, the volume of the sweep gas can be a large multiple of the volume of hydrogen in the anode exhaust, which can allow the effective hydrogen concentration on the permeate side to be maintained close to zero. The hydrogen thus separated can be incorporated into the turbine-fed methane where it can enhance the turbine combustion characteristics, as described above.

It is noted that excess $H_2$ produced in the anode can represent a fuel where the greenhouse gases have already been separated. Any $CO_2$ in the anode output can be readily separated from the anode output, such as by using an amine wash, a cryogenic $CO_2$ separator, and/or a pressure or vacuum swing absorption process. Several of the components of the anode output ($H_2$, CO, $CH_4$) are not easily removed, while $CO_2$ and $H_2O$ can usually be readily removed. Depending on the embodiment, at least about 90 vol % of the $CO_2$ in the anode output can be separated out to form a relatively high purity $CO_2$ output stream. Thus, any $CO_2$ generated in the anode can be efficiently separated out to form a high purity $CO_2$ output stream. After separation, the remaining portion of the anode output can correspond primarily to components with chemical and/or fuel value, as well as reduced amounts of $CO_2$ and/or $H_2O$. Since a substantial portion of the $CO_2$ generated by the original fuel (prior to reforming) can have been separated out, the amount of $CO_2$ generated by subsequent burning of the remaining portion of the anode output can be reduced. In particular, to the degree that the fuel in the remaining portion of the anode output is $H_2$, no additional greenhouse gases can typically be formed by burning of this fuel.

The anode exhaust can be subjected to a variety of gas processing options, including water-gas shift and separation of the components from each other.

Cathode Inputs and Outputs

Conventionally, a molten carbonate fuel cell can be operated based on drawing a desired load while consuming some portion of the fuel in the fuel stream delivered to the anode. The voltage of the fuel cell can then be determined by the load, fuel input to the anode, air and $CO_2$ provided to the cathode, and the internal resistances of the fuel cell. The $CO_2$ to the cathode can be conventionally provided in part by using the anode exhaust as at least a part of the cathode input stream. By contrast, the present invention can use separate/different sources for the anode input and cathode input. By removing any direct link between the composition of the anode input flow and the cathode input flow, additional options become available for operating the fuel cell, such as to generate excess synthesis gas, to improve capture of carbon dioxide, and/or to improve the total efficiency (electrical plus chemical power) of the fuel cell, among others.

In a molten carbonate fuel cell, the transport of carbonate ions across the electrolyte in the fuel cell can provide a method for transporting $CO_2$ from a first flow path to a second flow path, where the transport method can allow transport from a lower concentration (the cathode) to a higher concentration (the anode), which can thus facilitate capture of $CO_2$. Part of the selectivity of the fuel cell for $CO_2$ separation can be based on the electrochemical reactions allowing the cell to generate electrical power. For nonreactive species (such as $N_2$) that effectively do not participate in the electrochemical reactions within the fuel cell, there can be an insignificant amount of reaction and transport from cathode to anode. By contrast, the potential (voltage) difference between the cathode and anode can provide a strong driving force for transport of carbonate ions across the fuel cell. As a result, the transport of carbonate ions in the molten carbonate fuel cell can allow $CO_2$ to be transported from the cathode (lower $CO_2$ concentration) to the anode (higher $CO_2$ concentration) with relatively high selectivity. However, a challenge in using molten carbonate fuel cells for carbon dioxide removal can be that the fuel cells have limited ability to remove carbon dioxide from relatively dilute cathode feeds. The voltage and/or power generated by a carbonate fuel cell can start to drop rapidly as the $CO_2$ concentration falls below about 1.5 vol %. As the $CO_2$ concentration drops further, e.g., to below about 1.0 vol %, at some point the voltage across the fuel cell can become low enough that little or no further transport of carbonate may occur and the fuel cell ceases to function. Thus, at least some $CO_2$ is likely to be present in the exhaust gas from the cathode stage of a fuel cell under commercially viable operating conditions.

The amount of carbon dioxide delivered to the fuel cell cathode(s) can be determined based on the $CO_2$ content of a source for the cathode inlet. One example of a suitable $CO_2$-containing stream for use as a cathode input flow can be an output or exhaust flow from a combustion source. Examples of combustion sources include, but are not limited to, sources based on combustion of natural gas, combustion of coal, and/or combustion of other hydrocarbon-type fuels (including biologically derived fuels). Additional or alternate sources can include other types of boilers, fired heaters, furnaces, and/or other types of devices that burn carbon-containing fuels in order to heat another substance (such as water or air). To a first approximation, the $CO_2$ content of the output flow from a combustion source can be a minor portion of the flow. Even for a higher $CO_2$ content exhaust flow, such as the output from a coal-fired combustion source, the $CO_2$ content from most commercial coal-fired power plants can be about 15 vol % or less. More generally, the $CO_2$ content of an output or exhaust flow from a combustion source can be at least about 1.5 vol %, or at least about 1.6 vol %, or at least about 1.7 vol %, or at least about 1.8 vol %, or at least about 1.9 vol %, or at least greater 2 vol %, or at least about 4 vol %, or at least about 5 vol %, or at least about 6 vol %, or at least about 8 vol %. Additionally or alternately, the $CO_2$ content of an output or exhaust flow from a combustion source can be about 20 vol % or less, such as about 15 vol % or less, or about 12 vol % or less, or about 10 vol % or less, or about 9 vol % or less, or about 8 vol % or less, or about 7 vol % or less, or about 6.5 vol % or less, or about 6 vol % or less, or about 5.5 vol % or less, or about 5 vol % or less, or about 4.5 vol % or less. The concentrations given above are on a dry basis. It is noted that the lower $CO_2$ content values can be present in the exhaust from some natural gas or methane combustion sources, such as generators that are part of a power generation system that may or may not include an exhaust gas recycle loop.

Other potential sources for a cathode input stream can additionally or alternately include sources of bio-produced $CO_2$. This can include, for example, $CO_2$ generated during processing of bio-derived compounds, such as $CO_2$ generated during ethanol production. An additional or alternate example can include $CO_2$ generated by combustion of a bio-produced fuel, such as combustion of lignocellulose. Still other additional or alternate potential $CO_2$ sources can correspond to output or exhaust streams from various industrial processes, such as $CO_2$-containing streams generated by plants for manufacture of steel, cement, and/or paper.

Yet another additional or alternate potential source of $CO_2$ can be $CO_2$-containing streams from a fuel cell. The $CO_2$-containing stream from a fuel cell can correspond to a cathode output stream from a different fuel cell, an anode output stream from a different fuel cell, a recycle stream from the cathode output to the cathode input of a fuel cell, and/or a recycle stream from an anode output to a cathode input of a fuel cell. For example, an MCFC operated in standalone mode under conventional conditions can generate a cathode exhaust with a $CO_2$ concentration of at least about 5 vol %. Such a $CO_2$-containing cathode exhaust could be used as a cathode input for an MCFC operated according to an aspect of the invention. More generally, other types of fuel cells that generate a $CO_2$ output from the cathode exhaust can additionally or alternately be used, as well as other types of $CO_2$-containing streams not generated by a "combustion" reaction and/or by a combustion-powered generator. Optionally but preferably, a $CO_2$-containing stream from another fuel cell can be from another molten carbonate fuel cell. For example, for molten carbonate fuel cells connected in series with respect to the cathodes, the output from the cathode for a first molten carbonate fuel cell can be used as the input to the cathode for a second molten carbonate fuel cell.

For various types of $CO_2$-containing streams from sources other than combustion sources, the $CO_2$ content of the stream can vary widely. The $CO_2$ content of an input stream to a cathode can contain at least about 2 vol % of $CO_2$ or at least about 4 vol %, or at least about 5 vol %, or at least about 6 vol %, or at least about 8 vol %. Additionally or alternately, the $CO_2$ content of an input stream to a cathode can be about 30 vol % or less, such as about 25 vol % or less, or about 20 vol % or less, or about 15 vol % or less, or about 10 vol % or less, or about 8 vol % or less, or about 6 vol % or less, or about 4 vol % or less. For some still higher $CO_2$ content streams, the $CO_2$ content can be greater than about 30 vol %, such as a stream substantially composed of $CO_2$ with only incidental amounts of other compounds. As an example, a gas-fired turbine without exhaust gas recycle can produce an exhaust stream with a $CO_2$ content of approximately 4.2 vol %. With EGR, a gas-fired turbine can produce an exhaust stream with a $CO_2$ content of about 6-8 vol %. Stoichiometric combustion of methane can produce an exhaust stream with a $CO_2$ content of about 11 vol %. Combustion of coal can produce an exhaust stream with a $CO_2$ content of about 15-20 vol %. Fired heaters using refinery off-gas can produce an exhaust stream with a $CO_2$ content of about 12-15 vol %. A gas turbine operated on a low BTU gas without any EGR can produce an exhaust stream with a $CO_2$ content of ~12 vol %.

In addition to $CO_2$, a cathode input stream must include $O_2$ to provide the components necessary for the cathode reaction. Some cathode input streams can be based on having air as a component. For example, a combustion exhaust stream can be formed by combusting a hydrocarbon fuel in the presence of air. Such a combustion exhaust stream, or another type of cathode input stream having an oxygen content based on inclusion of air, can have an oxygen content of about 20 vol % or less, such as about 15 vol % or less, or about 10 vol % or less. Additionally or alternately, the oxygen content of the cathode input stream can be at least about 4 vol %, such as at least about 6 vol %, or at least about 8 vol %. More generally, a cathode input stream can have a suitable content of oxygen for performing the cathode reaction. In some aspects, this can correspond to an oxygen content of about 5 vol % to about 15 vol %, such as from about 7 vol % to about 9 vol %. For many types of cathode input streams, the combined amount of $CO_2$ and $O_2$ can correspond to less than about 21 vol % of the input stream, such as less than about 15 vol % of the stream or less than about 10 vol % of the stream. An air stream containing oxygen can be combined with a $CO_2$ source that has low oxygen content. For example, the exhaust stream generated by burning coal may include a low oxygen content that can be mixed with air to form a cathode inlet stream.

In addition to $CO_2$ and $O_2$, a cathode input stream can also be composed of inert/non-reactive species such as $N_2$, $H_2O$, and other typical oxidant (air) components. For example, for a cathode input derived from an exhaust from a combustion reaction, if air is used as part of the oxidant source for the combustion reaction, the exhaust gas can include typical components of air such as $N_2$, $H_2O$, and other compounds in minor amounts that are present in air. Depending on the nature of the fuel source for the combustion reaction, additional species present after combustion based on the fuel source may include one or more of $H_2O$, oxides of nitrogen (NOx) and/or sulfur (SOx), and other compounds either present in the fuel and/or that are partial or complete combustion products of compounds present in the fuel, such as CO. These species may be present in amounts that do not poison the cathode catalyst surfaces though they may reduce the overall cathode activity. Such reductions in performance may be acceptable, or species that interact with the cathode catalyst may be reduced to acceptable levels by known pollutant removal technologies.

The amount of $O_2$ present in a cathode input stream (such as an input cathode stream based on a combustion exhaust) can advantageously be sufficient to provide the oxygen needed for the cathode reaction in the fuel cell. Thus, the volume percentage of $O_2$ can advantageously be at least 0.5 times the amount of $CO_2$ in the exhaust. Optionally, as necessary, additional air can be added to the cathode input to provide sufficient oxidant for the cathode reaction. When some form of air is used as the oxidant, the amount of $N_2$ in the cathode exhaust can be at least about 78 vol %, e.g., at least about 88 vol %, and/or about 95 vol % or less. In some aspects, the cathode input stream can additionally or alternately contain compounds that are generally viewed as contaminants, such as $H_2S$ or $NH_3$. In other aspects, the cathode input stream can be cleaned to reduce or minimize the content of such contaminants.

A suitable temperature for operation of an MCFC can be between about 450° C. and about 750° C., such as at least about 500° C., e.g., with an inlet temperature of about 550° C. and an outlet temperature of about 625° C. Prior to entering the cathode, heat can be added to or removed from the combustion exhaust, if desired, e.g., to provide heat for other processes, such as reforming the fuel input for the anode. For example, if the source for the cathode input stream is a combustion exhaust stream, the combustion exhaust stream may have a temperature greater than a desired temperature for the cathode inlet. In such an aspect, heat can be removed from the combustion exhaust prior to use as the cathode input stream. Alternatively, the combustion exhaust could be at very low temperature, for example after a wet gas scrubber on a coal-fired boiler, in which case the combustion exhaust can be below about 100° C.

Molten Carbonate Fuel Cell Operation

In some aspects, a fuel cell may be operated in a single pass or once-through mode. In single pass mode, reformed products in the anode exhaust are not returned to the anode inlet. Thus, recycling syngas, hydrogen, or some other product from the anode output directly to the anode inlet is not done in single pass operation. More generally, in single pass operation, reformed products in the anode exhaust are also not returned indirectly to the anode inlet, such as by using reformed products to process a fuel stream subsequently introduced into the anode inlet. Optionally, $CO_2$ from the anode outlet can be recycled to the cathode inlet during operation of an MCFC in single pass mode. More generally, in some alternative aspects, recycling from the anode outlet to the cathode inlet may occur for an MCFC operating in single pass mode. Heat from the anode exhaust or output may additionally or alternately be recycled in a single pass mode. For example, the anode output flow may pass through a heat exchanger that cools the anode output and warms another stream, such as an input stream for the anode and/or the cathode. Recycling heat from anode to the fuel cell is consistent with use in single pass or once-through operation. Optionally but not preferably, constituents of the anode output may be burned to provide heat to the fuel cell during single pass mode.

Figure 4:
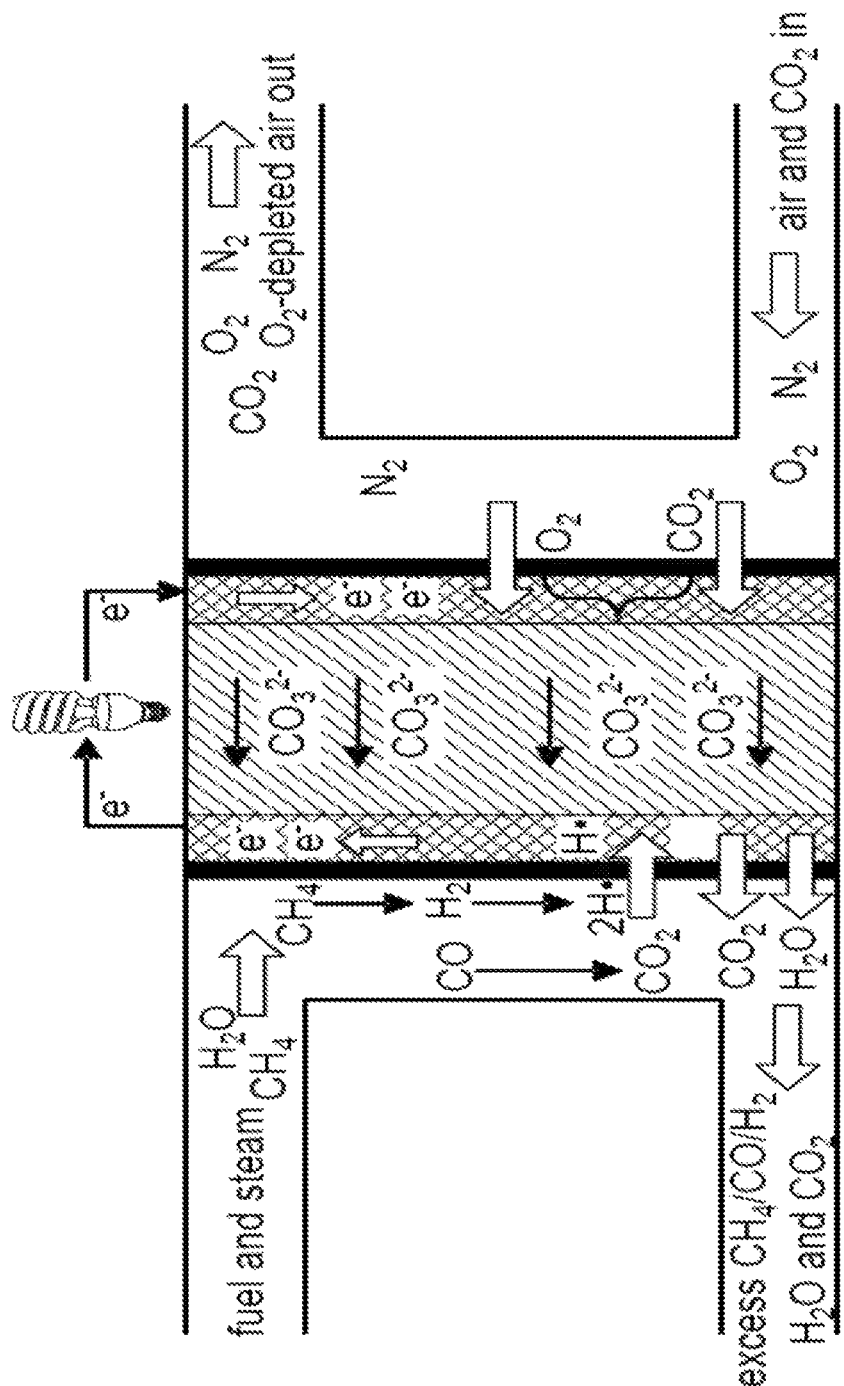
FIG. 4 schematically shows an example of the operation of a molten carbonate fuel cell.

FIG. 4 shows a schematic example of the operation of an MCFC for generation of electrical power. In FIG. 4, the anode portion of the fuel cell can receive fuel and steam ($H_2O$) as inputs, with outputs of water, $CO_2$, and optionally excess $H_2$, $CH_4$ (or other hydrocarbons), and/or CO. The cathode portion of the fuel cell can receive $CO_2$ and some oxidant (e.g., air/$O_2$) as inputs, with an output corresponding to a reduced amount of $CO_2$ in $O_2$-depleted oxidant (air). Within the fuel cell, $CO_3^{2-}$ ions formed in the cathode side can be transported across the electrolyte to provide the carbonate ions needed for the reactions occurring at the anode.

Several reactions can occur within a molten carbonate fuel cell such as the example fuel cell shown in FIG. 4. The reforming reactions can be optional, and can be reduced or eliminated if sufficient $H_2$ is provided directly to the anode.

The following reactions are based on $CH_4$, but similar reactions can occur when other fuels are used in the fuel cell.

$$\text{<anode reforming>} CH_4+H_2O \Rightarrow 3H_2+CO \quad (1)$$

$$\text{<water gas shift>} CO+H_2O \Rightarrow H_2+CO_2 \quad (2)$$

$$\text{<reforming and water gas shift combined>} CH_4+2H_2O \Rightarrow 4H_2+CO_2 \quad (3)$$

$$\text{<anode } H_2 \text{ oxidation>} H_2+CO_3^{2-} \Rightarrow H_2O+CO_2+2e^- \quad (4)$$

$$\text{<cathode>} \tfrac{1}{2}O_2+CO_2+2e^- \Rightarrow CO_3^{2-} \quad (5)$$

Reaction (1) represents the basic hydrocarbon reforming reaction to generate $H_2$ for use in the anode of the fuel cell. The CO formed in reaction (1) can be converted to $H_2$ by the water-gas shift reaction (2). The combination of reactions (1) and (2) is shown as reaction (3). Reactions (1) and (2) can occur external to the fuel cell, and/or the reforming can be performed internal to the anode.

Reactions (4) and (5), at the anode and cathode respectively, represent the reactions that can result in electrical power generation within the fuel cell. Reaction (4) combines $H_2$, either present in the feed or optionally generated by reactions (1) and/or (2), with carbonate ions to form $H_2O$, $CO_2$, and electrons to the circuit. Reaction (5) combines $O_2$, $CO_2$, and electrons from the circuit to form carbonate ions. The carbonate ions generated by reaction (5) can be transported across the electrolyte of the fuel cell to provide the carbonate ions needed for reaction (4). In combination with the transport of carbonate ions across the electrolyte, a closed current loop can then be formed by providing an electrical connection between the anode and cathode.

In various embodiments, a goal of operating the fuel cell can be to improve the total efficiency of the fuel cell and/or the total efficiency of the fuel cell plus an integrated chemical synthesis process. This is typically in contrast to conventional operation of a fuel cell, where the goal can be to operate the fuel cell with high electrical efficiency for using the fuel provided to the cell for generation of electrical power. As defined above, total fuel cell efficiency may be determined by dividing the electric output of the fuel cell plus the lower heating value of the fuel cell outputs by the lower heating value of the input components for the fuel cell. In other words, TFCE=(LHV(el)+LHV(sg out))/LHV(in), where LHV(in) and LHV(sg out) refer to the LHV of the fuel components (such as $H_2$, $CH_4$, and/or CO) delivered to the fuel cell and syngas ($H_2$, CO and/or $CO_2$) in the anode outlet streams or flows, respectively. This can provide a measure of the electric energy plus chemical energy generated by the fuel cell and/or the integrated chemical process. It is noted that under this definition of total efficiency, heat energy used within the fuel cell and/or used within the integrated fuel cell/chemical synthesis system can contribute to total efficiency. However, any excess heat exchanged or otherwise withdrawn from the fuel cell or integrated fuel cell/chemical synthesis system is excluded from the definition. Thus, if excess heat from the fuel cell is used, for example, to generate steam for electricity generation by a steam turbine, such excess heat is excluded from the definition of total efficiency.

Several operational parameters may be manipulated to operate a fuel cell with excess reformable fuel. Some parameters can be similar to those currently recommended for fuel cell operation. In some aspects, the cathode conditions and temperature inputs to the fuel cell can be similar to those recommended in the literature. For example, the desired electrical efficiency and the desired total fuel cell efficiency may be achieved at a range of fuel cell operating temperatures typical for molten carbonate fuel cells. In typical operation, the temperature can increase across the fuel cell.

In other aspects, the operational parameters of the fuel cell can deviate from typical conditions so that the fuel cell is operated to allow a temperature decrease from the anode inlet to the anode outlet and/or from the cathode inlet to the cathode outlet. For example, the reforming reaction to convert a hydrocarbon into $H_2$ and CO is an endothermic reaction. If a sufficient amount of reforming is performed in a fuel cell anode relative to the amount of oxidation of hydrogen to generate electrical current, the net heat balance in the fuel cell can be endothermic. This can cause a temperature drop between the inlets and outlets of a fuel cell. During endothermic operation, the temperature drop in the fuel cell can be controlled so that the electrolyte in the fuel cell remains in a molten state.

Parameters that can be manipulated in a way so as to differ from those currently recommended can include the amount of fuel provided to the anode, the composition of the fuel provided to the anode, and/or the separation and capture of syngas in the anode output without significant recycling of syngas from the anode exhaust to either the anode input or the cathode input. In some aspects, no recycle of syngas or hydrogen from the anode exhaust to either the anode input or the cathode input can be allowed to occur, either directly or indirectly. In additional or alternative aspects, a limited amount of recycle can occur. In such aspects, the amount of recycle from the anode exhaust to the anode input and/or the cathode input can be less than about 10 vol % of the anode exhaust, such as less than about 5 vol %, or less than about 1 vol %.

In some aspects, the electricity generated by the molten carbonate fuel cells integrated with a fired heater can be used to power various types of equipment associated with the fired heater, the fuel cells, and/or other equipment in a processing train related to the integrated fired heater. Examples of equipment that can be powered at least in part by the electricity generated by the molten carbonate fuel cells can include, but is not limited to, the induced and/or forced draft fans of the fired heater; pumps, such as those used in the separation section; and compressors, such as might be used to bring $H_2$ or $CO_2$ up to pipeline pressure.

Additional Integration Options

In various aspects, the flue gas from a fired heater can be passed into an MCFC that is incorporated as part of the structure of a fired heater, as described above. Preferably, the gas fired heater can combust natural gas, methane gas, or another hydrocarbon gas. The resulting $CO_2$-containing exhaust gas stream, herein flue gas, can be produced at an elevated temperature compatible with the MCFC operation, such as from 300° C. to 700° C., for example from 500° C. to 650° C. The fuel gas source for the combustion within the fired heater can optionally but preferably be cleaned of contaminants such as sulfur that can poison the MCFC before entering the fired heater's burner(s).

For integration with a combustion source, some alternative configurations for processing of a fuel cell anode can be desirable. For example, an alternative configuration can be to recycle at least a portion of the exhaust from a fuel cell anode to the input of a fuel cell anode. The anode output stream from an MCFC anode can include $H_2O$, $CO_2$, optionally CO, and optionally but typically unreacted fuel (such as $H_2$ and/or $CH_4$) as the primary output components. Instead of using this output stream as an external fuel stream and/or an input stream for integration with another process, one or more separations can be performed on the anode output stream in order to separate the $CO_2$ from the components with potential fuel value, such as $H_2$ or CO. The components with fuel value can then be recycled to the input of an anode.

This type of configuration can provide one or more benefits. First, $CO_2$ can be separated from the anode output by any suitable method, such as by using a cryogenic $CO_2$ separator or an amine wash separator. Several of the components of the anode output ($H_2$, CO, $CH_4$) are not easily condensable components, while $CO_2$ and $H_2O$ can be separated individually as condensed phases. Depending on the embodiment, at least about 90 vol % of the $CO_2$ in the anode output can be separated to form a relatively high purity $CO_2$ output stream. Alternatively, in some aspects less $CO_2$ can be removed from the anode output, so that about 50 vol % to about 90 vol % of the $CO_2$ in the anode output can be separated out, such as about 80 vol % or less or about 70 vol % or less. After separation, the remaining portion of the anode output can correspond primarily to components with fuel value, as well as reduced amounts of $CO_2$ and/or $H_2O$. This portion of the anode output after separation can be recycled for use as part of the anode input, along with additional fuel. In this type of configuration, even though the fuel utilization in a single pass through the MCFC(s) may be low, the unused fuel can be advantageously recycled for another pass through the anode. As a result, the single-pass fuel utilization can be at a reduced level, while avoiding loss (exhaust) of unburned fuel to the environment.

Additionally or alternatively to recycling a portion of the anode exhaust to the anode input, another configuration option can be to use a portion of the anode exhaust as an input for a combustion reaction for a turbine or other combustion device, such as a boiler, furnace, and/or fired heater. The relative amounts of anode exhaust recycled to the anode input and/or as an input to the combustion device can be any convenient or desirable amount. If the anode exhaust is recycled to only one of the anode input and the combustion device, the amount of recycle can be any convenient amount, such as up to 100% of the portion of the anode exhaust remaining after any separation to remove $CO_2$ and/or $H_2O$. When a portion of the anode exhaust is recycled to both the anode input and the combustion device, the total recycled amount by definition can be 100% or less of the remaining portion of anode exhaust. Otherwise, any convenient split of the anode exhaust can be used. In various embodiments of the invention, the amount of recycle to the anode input can be at least about 10% of the anode exhaust remaining after separations, for example at least about 25%, at least about 40%, at least about 50%, at least about 60%, at least about 75%, or at least about 90%. Additionally or alternately in those embodiments, the amount of recycle to the anode input can be about 90% or less of the anode exhaust remaining after separations, for example about 75% or less, about 60% or less, about 50% or less, about 40% or less, about 25% or less, or about 10% or less. Further additionally or alternately, in various embodiments of the invention, the amount of recycle to the combustion device can be at least about 10% of the anode exhaust remaining after separations, for example at least about 25%, at least about 40%, at least about 50%, at least about 60%, at least about 75%, or at least about 90%. Additionally or alternately in those embodiments, the amount of recycle to the combustion device can be about 90% or less of the anode exhaust remaining after separations, for example about 75% or less, about 60% or less, about 50% or less, about 40% or less, about 25% or less, or about 10% or less.

ADDITIONAL EMBODIMENTS

Embodiment 1

A method of treating flue gas generated by a fired heater using molten carbonate fuel cells, the method comprising: introducing a fuel and an oxidant into a fired heater; combusting the fuel in the fired heater to produce a flue gas comprising a first content of $CO_2$; passing at least a portion of the flue gas into cathode inlets of a plurality of molten carbonate fuel cells to generate an anode exhaust and a cathode exhaust having a second content of $CO_2$, a ratio of the second content of $CO_2$ to the first content of $CO_2$ being about 0.5:1 or less; and passing at least a portion of the cathode exhaust, optionally substantially all of the cathode exhaust or all of the cathode exhaust, into a convection heating section of the fired heater.

Embodiment 2

The method of Embodiment 1, wherein a ratio of a flue gas flow path length for flue gas passing through the molten carbonate fuel cell cathodes relative to a fired heater path length is about 1.0 to about 3.0, or about 1.0 to about 2.8, or about 1.0 to about 2.5, or about 1.0 to about 2.2, or about 1.1 to about 3.0, or about 1.1 to about 2.8, or about 1.0 to about 2.5, or about 1.0 to about 2.2.

Embodiment 3

The method of any of the above embodiments, wherein an amount of the oxidant corresponds to a relative excess total heater oxidant value of about 0.27 to about 0.65, or at least about 0.37, or at least about 0.40, or at least about 0.43, or at least about 0.47, and/or about 0.60 or less, or about 0.55 or less, or about 0.50 or less.

Embodiment 4

The method of any of the above embodiments, wherein the anode exhaust comprises at least about 25% of the $CO_2$ contained in the at least a portion of the flue gas passed into the plurality of molten carbonate fuel cells, or at least about 50%, or at least about 75%.

Embodiment 5

The method of any of the above embodiments, wherein the plurality of molten carbonate fuel cells are located within a contiguous insulated environment of the fired heater, wherein the plurality of molten carbonate fuel cells are located in an adjacent volume to the fired heater, or a combination thereof.

Embodiment 6

The method of any of the above embodiments, wherein substantially all of the flue gas is passed into a cathode section of the plurality of molten carbonate fuel cells.

Embodiment 7

The method of any of the above embodiments, wherein the method further comprises passing the flue gas into the plurality of molten carbonate fuel cells with a superficial velocity of about 0.4 m/s to about 1.7 m/s.

Embodiment 8

The method of any of the above embodiments, wherein the method further comprises: introducing a reformable fuel into anodes of the plurality of molten carbonate fuel cells; receiving the anode exhaust from the anodes of the plurality of molten carbonate fuel cells; and passing the anode exhaust to a $CO_2$ removal system.

Embodiment 9

The method of any of the above embodiments, wherein the method further comprises, prior to said passing the at least a portion of the flue gas into cathode inlets of the plurality of molten carbonate fuel cells, passing the at least a portion of the flue gas through a supplemental heat transfer section.

Embodiment 10

The method of Embodiment 9, wherein the supplemental heat transfer section is configured to reduce the flue gas temperature to less than about 700° C.

Embodiment 11

The method of any of the above embodiments, wherein the plurality of molten carbonate fuel cells are operated with a current density of greater than about 1500 mA/m².

Embodiment 12

The method of any of the above embodiments, further comprising operating the plurality of molten carbonate fuel cells to produce a cathode exhaust with a higher temperature than the flue gas introduced into the cathode inlet.

Embodiment 13

The method of any of the above embodiments, wherein the fuel comprises a gas phase fuel, the fuel optionally comprising natural gas, wherein the oxidant comprises oxygen, the oxidant optionally being introduced by introducing air into the fired heater, or a combination thereof.

Embodiment 14

The method of any of the above embodiments, wherein the fired heater comprises a) a natural draft fired heater, b) a forced draft fired heater, c) a fired heater integrated with at least one of a steam methane reformer, an ethylene furnace, or a delayed coking furnace, or d) a combination thereof.

Embodiment 15

The method of any of the above embodiments, wherein the plurality of molten carbonate fuel cells are located in the convection heating section, are located in a supplemental heat transfer section, or a combination thereof.

Embodiment 16

A fired heater for producing electricity using integrated molten carbonate fuel cells comprising an anode and cathode, the fired heater comprising: a radiant heating section; a burner, optionally in fluid communication with the radiant heating section and/or located within the radiant heating section, that generates a flue gas that comprises $CO_2$; a plurality of molten carbonate fuel cells, the molten carbonate fuel cells having cathode inlets in fluid communication with the radiant heating section to receive at least a portion of the flue gas, the plurality of molten carbonate fuel cells further having a plurality of cathode outlets configured to discharge a cathode exhaust and a plurality of anode outlets configured to discharge an anode exhaust; and a convection section in fluid communication with the plurality of cathode outlets to receive at least a portion of the cathode exhaust therefrom, optionally substantially all of the cathode exhaust or all of the cathode exhaust, the convection section comprising a plurality of convection tubes to remove heat energy from the cathode exhaust.

Embodiment 17

The fired heater of Embodiment 16, wherein a ratio of a flue gas flow path length for flue gas passing through the molten carbonate fuel cell cathodes relative to a fired heater path length is about 1.0 to about 3.0, or about 1.0 to about 2.8, or about 1.0 to about 2.5, or about 1.0 to about 2.2, or about 1.1 to about 3.0, or about 1.1 to about 2.8, or about 1.0 to about 2.5, or about 1.0 to about 2.2.

Embodiment 18

The fired heater of Embodiment 16 or 17, further comprising a supplemental heat transfer section disposed between the radiant heating section and the plurality of molten carbonate fuel cells, the supplemental heat transfer section optionally configured to cool the flue gas to less than about 700° C.

Embodiment 19

The fired heater of any of Embodiments 16-18, wherein the plurality of molten carbonate fuel cells are located in the convection heating section, are located in a supplemental heat transfer section, or a combination thereof.

Embodiment 20

The fired heater of any of Embodiments 16-19, wherein the plurality of molten carbonate fuel cells further comprise anodes configured to receive a reformable fuel and generate the anode exhaust, the anode exhaust comprising $CO_2$ and synthesis gas.

Embodiment 21

The fired heater of any of Embodiments 16-20, wherein a manifold for passing flue gas into the cathode inlets of the plurality of molten carbonate fuel cells comprises an interior wall of the fired heater.

Embodiment 22

The fired heater of any of Embodiments 16-21, wherein the plurality of molten carbonate fuel cells are located within a contiguous insulated environment of the fired heater, wherein the plurality of molten carbonate fuel cells are located in an adjacent volume to the fired heater, or a combination thereof.

Embodiment 23

The fired heater of any of Embodiments 16-22, wherein the fired heater comprises a) a natural draft fired heater, b) a forced draft fired heater, c) a fired heater integrated with at least one of a steam methane reformer, an ethylene furnace, or a delayed coking furnace, or d) a combination thereof.

Embodiment 24

The fired heater of any of Embodiments 16-23, wherein the burner receives a fuel comprising a gas phase fuel, the fuel optionally comprising natural gas, wherein the burner receives an oxidant optionally comprising oxygen, the oxidant optionally being introduced by introducing air into the fired heater, or a combination thereof.

Embodiment 25

The fired heater of Embodiment 24, wherein an amount of the oxidant corresponds to a relative excess total heater oxidant value of about 0.27 to about 0.65, or at least about 0.37, or at least about 0.40, or at least about 0.43, or at least about 0.47, and/or about 0.60 or less, or about 0.55 or less, or about 0.50 or less.

EXAMPLES

Example 1: Detailed Configuration Example

Detailed calculations were performed on an integrated fired heater configuration similar to the configuration shown in FIG. 2, with the exception that additional air was not added after the burner. Instead, additional air was added to the feed to the burner. The calculations were used to determine the feasibility of integration of molten carbonate fuel cells (as an MCFCR). The calculations were based in part on a detailed fired heater simulation published by Ibrahim and Al-Qassimi (Hassan Al-Haj Ibrahim and Mourhaf Al-Qassimi, "Simulation of heat transfer in the convection section of fired process heaters," Chemical Engineering 54//1 (2010) p. 33-40), and based in part on an empirical molten carbonate fuel cell model developed using Hysys™ simulation software.

Figure 10:
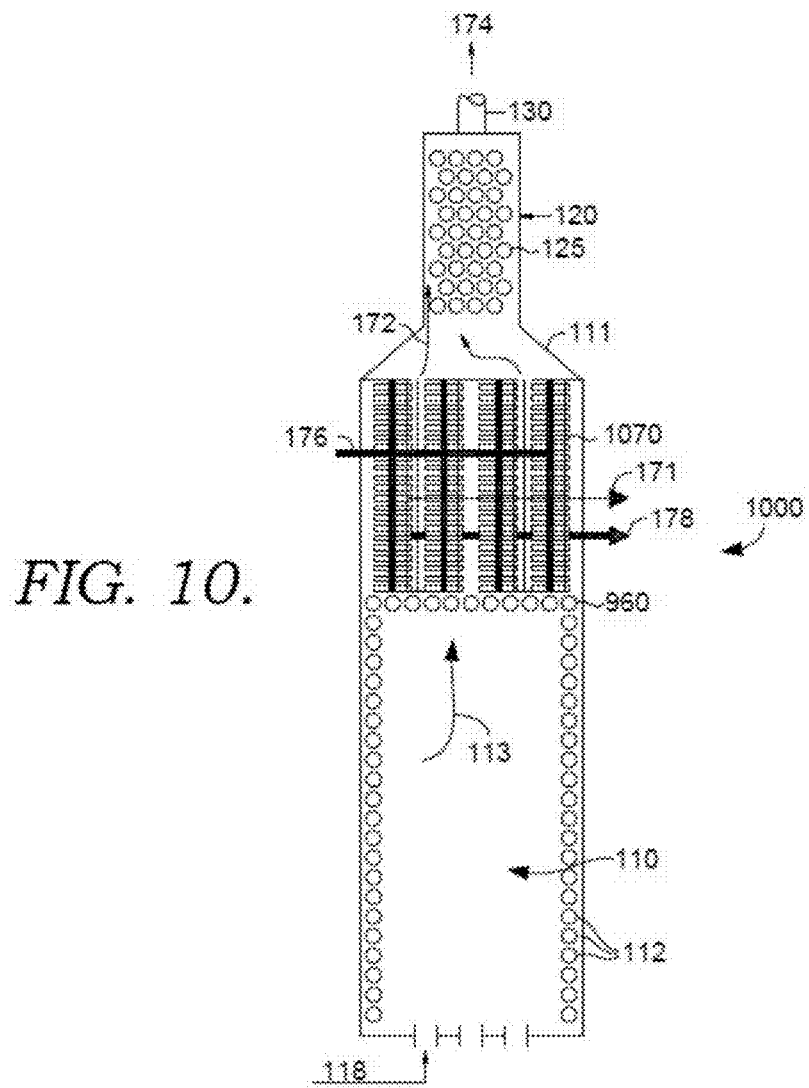
FIG. 10 schematically shows an example of molten carbonate fuel cells integrated within a fired heater.

Number of Stacks and Configuration of the MCFCR:

The fired heater in this example corresponds to the fired heater configuration shown in column 1 of FIG. 9. FIG. 10 also schematically shows additional details regarding the integrated configuration that was arrived at based on the calculations, which was similar to the configuration shown in FIG. 2. However, it is noted that although FIG. 10 appears to show a vertical configuration, the calculations shown in this example were based on having the MCFCRs in a horizontal configuration. As shown in column 1 of FIG. 9, the fired duty (burner duty) of the heater is ~105.7 MBTU/hr. Assuming that ~1.206 kmol $CO_2$ are produced per MBTU, the amount of $CO_2$ produced by the burners is $(105.7)(1.206) \approx 127.5$ kmol/hr. In this example, it is assumed that 0.0348 MW of fuel cells are required for each kmol/hr $CO_2$. Based on this assumption, $(127.5)(0.0348) \approx 4.44$ MW of fuel cells are needed to process the flue gas generated by the fired heater.

Assuming that the MCFC modules can be stacked to any desired height, the height of the fuel cell stack was set at ~4.8 m so that the stack could lay horizontally across the top of the ~4.8 m wide radiant section. Based on conventional fuel cell stack designs, a fuel cell stack based on fuel cells as described in Column 1 of FIG. 9 with a stack height of about 4.0 m can generate about 350 kW of power. Assuming that the power scales proportionally with height, each ~4.8 m stack can then generate $(4.8/4)(350 \text{ kW}) \approx 420$ kW. Based on these calculations, the number of stacks required was $(4.44/0.420) \approx 10.6$, which was rounded up to 11 stacks for this MCFCR. Each stack was ~1.5 m wide, so width of the MCFCR is $(11)(1.5) \approx 16.5$ m, which can fit within the ~20 m width of the top of the radiant section. It was assumed that an additional wall or walls could be present to occupy the remaining portion of the ~20 m width, so that substantially all of the flue gas in the fired heater was forced to pass through the fuel cells in the MCFCR.

Location of the MCFCR:

The calculations for the fired heater alone showed that at the end of the radiant section, the temperature of the flue gas was about 1073° K, or about 800° C. In order to match the location of the MCFCR with this temperature, an additional row of tubes was included in a region having the cross-section of the radiant section but with heat transfer characteristics more similar to the convection section (i.e., a supplemental heat transfer section). Based on the simulations for the fired heater alone, this additional row of tubes resulted in a decrease in the flue gas temperature to about 959° K or 686° C., which was suitable as an inlet temperature for the fuel cells in the MCFCR. FIG. 10 shows an example of a fired heater 1000 having an MCFCR 1070 in the location selected based on including an additional row of tubes 1060 upstream from the MCFCR 1070 to provide a supplemental heat transfer section for additional cooling of the flue gas.

Additional Air Required, $CO_2$ and $O_2$ Balances:

Using the Hysys™ simulation, the amount of additional air required and the amount of $CO_2$ removed from the flue gas were calculated using two constraints. One constraint was that the cathode exit gas should have $CO_2$ mole fraction of ~0.01, which is believed to correspond to a $CO_2$ content in the cathode exhaust that still allows for normal operation of the fuel cells. The other constraint was to have an $O_2$ content (mole fraction) in the cathode exhaust of ~0.0382, which was the same as the $O_2$ content for the simulations of the fired heater without the additional fuel cells. Based on these constraints, the calculations showed ~123.1 kmol/hr of $CO_2$ removed from the flue gas, using ~317.5 kmol/hr of additional air that was added to the feed to the burner. This resulted in simulated removal of ~87.0% of the $CO_2$ in the flue gas. Additional details regarding the molar flows and compositions of $CO_2$ and $O_2$ are given in Table 2 (all values are approximate).

TABLE 2

| $CO_2$ and $O_2$ Balances | |
|---|---|
| CO2 Balance | |
| Cathode inlet CO2, kmol/hr | 141.50 |
| Cathode outlet CO2, kmol/hr | 18.43 |
| Anode inlet CO2, kmol/hr | 1.01 |
| Anode outlet CO2, kmol/hr | 151.01 |
| Cathode inlet CO2, molf | 0.0694 |
| Cathode outlet CO2, molf | 0.0100 |
| Anode inlet CO2, molf | 0.0068 |
| Anode outlet CO2, molf | 0.4147 |
| O2 Balance | |
| Air to burners, no MCFC, kmol/hr | 1589.00 |
| Extra air to burners with MCFC, kmol/hr | 317.50 |
| Cathode inlet O2, kmol/hr | 132.30 |

TABLE 2-continued

$CO_2$ and $O_2$ Balances

| | |
|---|---|
| Cathode outlet O2, kmol/hr | 70.78 |
| Cathode inlet O2, molf | 0.0649 |
| Cathode outlet O2, molf | 0.0382 |

Table 3 provides details of the Relative Excess Total Heater Oxidant (RETHO) calculation for the fired heater in this example during conventional operation and during operation with the integrated MCFCR (all values are approximate). When operated as a conventional fired heater the RETHO value was calculated to be ~0.264. When modified with MCFC stacks and operated so as to remove ~87% of the $CO_2$, while keeping the same flue gas stack $O_2$ mole fraction of ~0.0382, the RETHO jumped by almost a factor of 2 to ~0.517.

TABLE 3

Relative Excess Heater Total Oxidant (REHTO)

| | Horns |
|---|---|
| REHTO without MCFC | |
| flue gas stack O2, molf | 0.0382 |
| Injected Heater Total Oxidant (IHTO), kmol/hr | 334 |
| Total Heater Combustion fuel (THFC), kmol/hr | 120 |
| Stoichiometric Heater Total Oxidant (SHTO), kmol/hr | 264 |
| Excess Total Heater Oxidant (ETHO), kmol/hr | 70 |
| Relative Excess Total Heater Oxidant (RETHO), kmol/hr | 0.2640 |
| REHTO with MCFC | |
| flue gas stack O2, molf | 0.0382 |
| fraction CO2 removed from flue gas | 0.8698 |
| Injected Heater Total Oxidant (IHTO), kmol/hr | 400 |
| Total Heater Combustion fuel (THFC), kmol/hr | 120 |
| Stoichiometric Heater Total Oxidant (SHTO), kmol/hr | 254 |
| Excess Total Heater Oxidant (ETHO), kmol/hr | 136 |
| Relative Excess Total Heater Oxidant (RETHO), kmol/hr | 0.5165 |

Example 2: Thermal Efficiency Comparison

Figure 11:
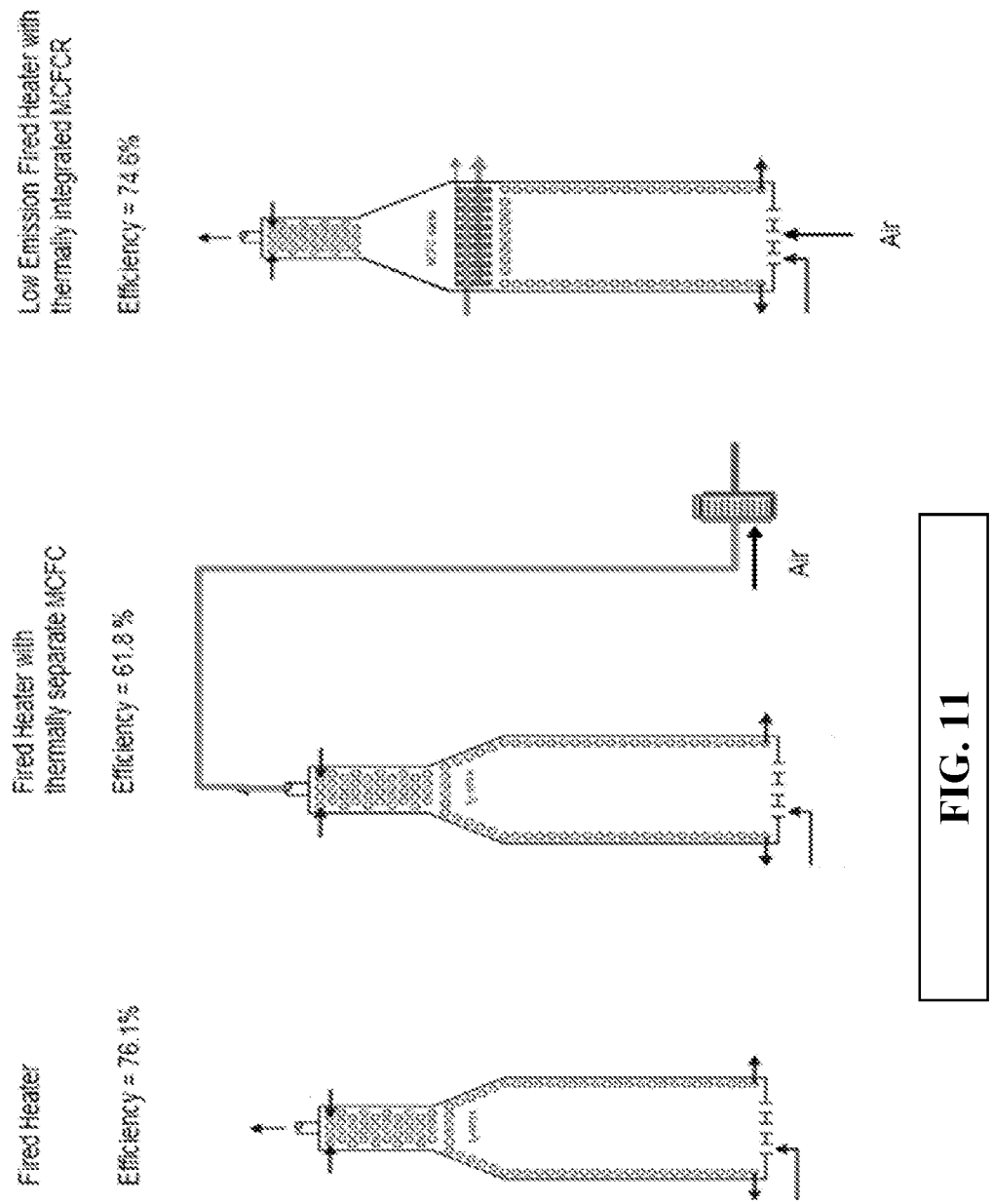
FIG. 11 schematically shows examples of various fired heater and molten carbonate fuel cell configurations.

Additional calculations were performed based on the fired heater and integrated fired heater configurations described in Example 1 to determine relative thermal efficiencies for various configurations. FIG. 11 schematically illustrates three fired heater configurations that were evaluated for overall thermal efficiency. The first configuration 1110 corresponds to the conventional fired heater described in Example 1. The second configuration 1120 corresponds to using molten carbonate fuel cells with the fired heater from Example 1 by transporting the flue gas from the fired heater to a separate (i.e., not thermally integrated) group of molten carbonate fuel cells. The third configuration 1130 corresponds to the integrated configuration described in Example 1. Table 4 summarizes the thermal efficiency calculation for each case (all values are approximate).

TABLE 4

Thermal Efficiency Comparison

| | Fired Heater | Fired heater separate MCFC | LEFH |
|---|---|---|---|
| Energy Balance Inputs | | | |
| Fired duty (LHV), MW | 30.981 | 30.981 | 30.981 |
| Natural gas to fuel cells (LHV), MW | | 10.800 | 10.800 |
| Heat up additional air (MW) | | 1.810 | 1.810 |
| Flue gas reheat, MW | | 4.740 | |
| H2/CO2 separation | | 0.340 | 0.340 |
| CO2 compression (2215 psia), MW | | 0.731 | 0.731 |
| Energy Balance Outputs | | | |
| Process duty (LHV), MW | 23.576 | 23.576 | 23.576 |
| Process Duty from fuel cells, MW | | | 1.680 |
| Electric Power from fuel cells, MW | | 4.070 | 4.070 |
| Hydrogen value (LHV), MW | | 2.870 | 2.870 |
| Process duty from anode exhaust, MW | | | 1.140 |
| Thermal Efficiency | 0.761 | 0.618 | 0.746 |

The first column of Table 4 shows results from calculations for the efficiency for the fired heater as operated in a conventional manner. For this case the thermal efficiency was simply the ratio of heat absorbed by the process fluid (~23.58 MW) to the heating value of the natural gas provided by the burners (~30.98 MW), for value of ~76.1%.

The second column of Table 4 shows results from calculations for the efficiency for a fired heater that is configured to pass the resulting flue gas to an external, thermally separate processing unit containing molten carbonate fuel cells. This case corresponds to a conventional choice for $CO_2$ removal. As shown from the calculation results in Table 4, energy inputs included, in addition to the heating value of the natural gas to the burners (~30.98 MW): a) the heating value of natural gas provided to the MCFC (~10.8 MW); b) the energy required to heat up the additional air (~1.81 MW); c) the heat required to bring the flue gas from the chimney exit temperature of ~381° C. up to the cathode inlet temperature of ~685° C. (~4.74 MW); d) the energy required to separate the $H_2$ from the $CO_2$ (~0.340 MW); and e) the energy required to compress the $CO_2$ up to pipeline pressure (~0.731 MW). The energy outputs included, in addition to the process duty from the heater: f) the electrical energy from the fuel cell (~4.07 MW); and g) the heating value of $H_2$ produced (~2.87 MW). The net result was a thermal efficiency of ~61.8%.

The third column of Table 4 shows results from calculations for the efficiency for an integrated fired heater as described herein. In this case there was no need to reheat the flue gas to bring it up to the cathode inlet temperature of the MCFCR because it was thermally integrated into the convection section. Thus, energy cost c) from the calculations shown in the second column of Table 4 was not required for the integrated fired heater. As a result, the energy inputs included, in addition to the heating value of the natural gas to the burners (~30.98 MW): a) the heating value of natural gas provided to the MCFC (~10.8 MW); b) the energy required to heat up the additional air (~1.81 MW); d) the energy required to separate the $H_2$ from the $CO_2$ (~0.340 MW); and e) the energy required to compress the $CO_2$ up to pipeline pressure (~0.731 MW). The energy outputs included, in addition to the process duty from the heater: f) the electrical energy from the fuel cells (~4.07 MW); g) the heating value of $H_2$ produced (~2.87 MW); h) the process duty from heat produced by the fuel cells (~1.68 MW); and j) the process duty from the anode exhaust (~1.14 MW). The net result was a thermal efficiency of ~74.6%, which was significantly higher than the efficiency of the configuration having a fired heater with thermally separate fuel cells as shown in column 2 of Table 4.

Example 3: General Configuration Examples

In addition to the configuration described in Example 1, FIG. 9 also provides examples of sizing and configuration details for integration of molten carbonate fuel cells with two additional types of fired heater sizes and/or configurations. In FIG. 9, the first portion of the configuration details corresponds to characteristics of three different potential box-type fired heater configurations that could be suitable for modification by integration with molten carbonate fuel cells. The second portion of the configuration details in FIG. 9 corresponds to details for how MCFCRs can be arranged to process the flue gas for the various fired heater configurations.

In FIG. 9, the example fired heater configurations in columns 1 and 3 have sufficient cross-sectional area at the top of the radiant section that a single horizontally oriented MCFCR can be used to process the flue gas. For the fired heater configuration in column 2, the smaller cross-sectional area of the firebox (radiant heating section) does not provide sufficient cross-sectional area for horizontal orientation of a sufficient number of fuel cells to process the flue gas. For the fired heater configuration in column 2, the fuel cells are instead arranged as 2 MCFCRs in a volume adjacent to the convection section, similar to the configuration shown in FIG. 8A.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

What is claimed is:

1. A method of treating flue gas generated by a fired heater using molten carbonate fuel cells, the method comprising:
introducing a fuel and an oxidant into a fired heater comprising a radiant section and a convective section;
combusting the fuel and oxidant in the radiant section of the fired heater to produce a flue gas at a first operating temperature, said flue gas comprising a first content of $CO_2$;
transferring heat from the flue gas to a first plurality of heating tubes within the radiant section;
passing, after transferring the heat, at least a portion of the flue gas into cathode inlets of a plurality of molten carbonate fuel cells to generate an anode exhaust and a cathode exhaust having a second content of $CO_2$, a ratio of the second content of $CO_2$ to the first content of $CO_2$ being about 0.5:1 or less;
passing the cathode exhaust into the convective section of the fired heater; and
transferring heat from the cathode exhaust to a second plurality of convection tubes within the convective section,
wherein the fired heater and the molten carbonate fuel cells are in a contiguous insulated environment.

2. The method of claim 1, wherein a ratio of a flue gas flow path length for flue gas passing through the molten carbonate fuel cell cathodes relative to a fired heater path length is about 1.0 to about 3.0.

3. The method of claim 1, wherein an amount of the oxidant corresponds to a relative excess total heater oxidant value of about 0.27 to about 0.65.

4. The method of claim 1, wherein the anode exhaust comprises at least about 25% of the $CO_2$ contained in the at least a portion of the flue gas passed into the plurality of molten carbonate fuel cells.

5. The method of claim 1, wherein substantially all of the flue gas is passed into a cathode section of the plurality of molten carbonate fuel cells.

6. The method of claim 1, wherein the method further comprises passing the flue gas into the plurality of molten carbonate fuel cells with a superficial velocity of about 0.4 m/s to about 1.7 m/s.

7. The method of claim 1, wherein the method further comprises:
introducing a reformable fuel into anodes of the plurality of molten carbonate fuel cells;
receiving the anode exhaust from the anodes of the plurality of molten carbonate fuel cells; and
passing the anode exhaust to a $CO_2$ removal system.

8. The method of claim 1, wherein the transferring the heat from the flue gas to the first plurality of heating tubes reduces the flue gas temperature to less than about 700° C.

9. The method of claim 1, wherein the plurality of molten carbonate fuel cells are operated with a current density of greater than about 1500 mA/m$^2$.

10. The method of claim 1, wherein the fuel comprises a gas phase fuel, the gas phase fuel optionally comprising natural gas, wherein the oxidant comprises oxygen, the oxidant optionally being introduced by introducing air into the fired heater, or a combination thereof.

11. The method of claim 1, wherein the fired heater comprises a) a natural draft fired heater, b) a forced draft fired heater, c) a fired heater integrated with at least one of a steam methane reformer, an ethylene furnace, or a delayed coking furnace, or d) a combination thereof.

12. A fired heater for producing electricity using integrated molten carbonate fuel cells comprising an anode and cathode, the fired heater comprising:
a radiant heating section;
a burner in the radiant heating section that generates a flue gas that comprises $CO_2$;
a first plurality of heating tubes in the radiant heating section;
a plurality of molten carbonate fuel cells, the molten carbonate fuel cells having cathode inlets in fluid communication with the radiant heating section to receive at least a portion of the flue gas, the plurality of molten carbonate fuel cells further having a plurality of cathode outlets configured to discharge a cathode exhaust and a plurality of anode outlets configured to discharge an anode exhaust; and
a convection section in fluid communication with the plurality of cathode outlets to receive at least a portion of the cathode exhaust therefrom, the convection section comprising a plurality of convection tubes to remove heat energy from the cathode exhaust,
wherein the plurality of molten carbonate fuel cells further comprise anodes configured to receive a reformable fuel and generate the anode exhaust, the anode exhaust comprising CO2 and synthesis gas and wherein the fired heater and the molten carbonate fuel cells are in a contiguous insulated environment.

13. The system of claim 12, wherein a ratio of a flue gas flow path length for flue gas passing through the molten carbonate fuel cell cathodes relative to a fired heater path length is about 1.0 to about 3.0.

14. The method of claim 12, wherein the burner receives a fuel and an oxidant, an amount of the oxidant corresponding to a relative excess total heater oxidant value of about 0.27 to about 0.65.

15. The fired heater of claim 12, wherein a manifold for passing flue gas into the cathode inlets of the plurality of molten carbonate fuel cells comprises an interior wall of the fired heater.

16. The method of claim 12, wherein substantially all of the flue gas is passed into cathodes of the plurality of molten carbonate fuel cells.

17. The method of claim 1, wherein the fired heater comprises a) a natural draft fired heater, b) a forced draft fired heater, c) a fired heater integrated with at least one of a steam methane reformer, an ethylene furnace, or a delayed coking furnace, or d) a combination thereof.

* * * * *